(12) United States Patent
Liebel et al.

(10) Patent No.: US 8,199,407 B2
(45) Date of Patent: Jun. 12, 2012

(54) IMMERSION OBJECTIVE, APPARATUS FOR FORMING AN IMMERSION FILM AND METHOD

(75) Inventors: Urban Liebel, Dielheim-Horrenberg (DE); Siegfried Winkler, Heidelberg (DE); Frank Sieckmann, Bochum (DE)

(73) Assignees: Leica Microsystems CMS GmbH, Wetzlar (DE); EMBL European Molecular Biology Laboratory, Heidelberg (DE)

( * ) Notice: Subject to any disclaimer, the term of this patent is extended or adjusted under 35 U.S.C. 154(b) by 174 days.

(21) Appl. No.: 12/439,619

(22) PCT Filed: Sep. 7, 2007

(86) PCT No.: PCT/DE2007/001583
§ 371 (c)(1),
(2), (4) Date: Sep. 14, 2009

(87) PCT Pub. No.: WO2008/028475
PCT Pub. Date: Mar. 13, 2008

(65) Prior Publication Data
US 2010/0027109 A1    Feb. 4, 2010

(30) Foreign Application Priority Data

Sep. 7, 2006  (DE) .......................... 10 2006 042 088
Sep. 7, 2006  (DE) .......................... 10 2006 042 499

(51) Int. Cl.
*G02B 21/02*    (2006.01)

(52) U.S. Cl. ....................................... 359/656; 359/509
(58) Field of Classification Search .......... 359/656–661; 250/201.3
See application file for complete search history.

(56) References Cited

U.S. PATENT DOCUMENTS

| | | | |
|---|---|---|---|
| 3,202,049 A | 8/1965 | Bond | |
| 3,837,731 A | 9/1974 | Amos et al. | |
| 5,719,700 A | 2/1998 | Corcuff et al. | |
| 6,413,252 B1 | 7/2002 | Zavislan | |
| 6,980,293 B1 | 12/2005 | Harada et al. | |
| 7,324,274 B2 * | 1/2008 | Komatsu et al. | 359/391 |
| 7,864,437 B2 * | 1/2011 | Komatsu et al. | 359/661 |
| 2006/0050351 A1 | 3/2006 | Higashiki | |
| 2007/0291360 A1 * | 12/2007 | Pirsch | 359/509 |

FOREIGN PATENT DOCUMENTS

| | | |
|---|---|---|
| DE | 4417079 | 12/1995 |
| DE | 20205080 | 6/2002 |
| DE | 10333326 | 3/2005 |
| EP | 1489461 | 12/2004 |
| EP | 1717628 | 11/2006 |

(Continued)

*Primary Examiner* — Jordan Schwartz
(74) *Attorney, Agent, or Firm* — Leydig, Voit & Mayer, Ltd.

(57) ABSTRACT

An immersion objective for microscopic investigation of a specimen is provided wherein an outer lens is disposed in an objective body. A delivery device including a cap that is disposed over the objective body so as to form a space adapted to receive an immersion liquid is also provided. The cap is open in a region of the outer lens so as to form a gap with the outer lens. The cap includes at least one connector configured to provide a continuous supply of the immersion liquid to the space so that the immersion liquid emerges through the gap to a region between the outer lens and at least one of the specimen and a specimen slide.

46 Claims, 16 Drawing Sheets

FOREIGN PATENT DOCUMENTS

| | | |
|---|---|---|
| EP | 1777572 | 4/2007 |
| JP | 2004038500 A | 2/2004 |
| JP | 2005227098 | 8/2005 |
| JP | 2005234457 | 9/2005 |
| WO | WO-02093232 | 11/2002 |
| WO | WO-2005010591 | 2/2005 |
| WO | WO-2005078503 | 8/2005 |
| WO | WO-2006009212 | 1/2006 |

* cited by examiner

IMMERSION OBJECTIVE, APPARATUS FOR FORMING AN IMMERSION FILM AND METHOD

CROSS REFERENCE TO PRIOR APPLICATIONS

This application is a U.S. National Phase application under 35 U.S.C. §371 of International Application No. PCT/DE2007/001583, filed on Sep. 7, 2007, and claims benefit to German Patent Application Nos. DE 10 2006 042 499.9, filed on Sep. 7, 2006, and DE 10 2006 042 088.8, filed Sep. 7, 2006. The International Application was published in German on Mar. 13, 2008 as WO 2008/028475 under PCT Article 21(2).

FIELD

The present invention relates to an apparatus and a method for forming an immersion film of an immersion liquid between a lens of a microscope objective and a sample slide.

BACKGROUND

Immersion objectives have been known for a long time from practical use. The idea underlying such objectives is that image quality in terms of light intensity and resolution can be utilized by optimally exploiting the so-called angular aperture of an objective. In order to achieve optimum utilization of the information available in the light that is to be analyzed, it is most common to use immersion liquids, which improve the optical transition between a preparation and the objective. The immersion liquid increases the total refractive index of the objective lens and thus its numerical aperture, which can be calculated from the refractive index of the immersion liquid and the sine of half the angular aperture.

Immersion liquids are liquids whose refractive index is close to the refractive index of the glass used for the sample slide and lenses. If an air gap between an entrance or exit lens of a microscope objective (hereinafter called simply an "objective lens") and a sample slide is filled with an immersion liquid of this kind, the numerical aperture of the objective is increased. This results in increased light intensity, and furthermore permits increased resolution for the objective.

Liquids are preferably used as immersion media, for example water, oil, or glycerol. Liquids having substances added to them are also a possibility, for example caffeine in order to decrease bacterial development in the water. Surfactants are also used. It is also possible to use immersion gases. When immersion gases are used, they are allowed to flow through continuously, at a certain temperature and flow rate, between the objective lens and the objective specimen slide or specimen.

Depending on the refractive index of the immersion medium, a more or less perfect optical adaptation to the refractive indices of the objective lenses and the objective carrier, which are usually manufactured from glass, can be achieved. With such a "perfect" adaptation, the otherwise usual light losses triggered by refraction and/or total reflection at the specimen slide are almost entirely eliminated, but at least very considerably reduced. In practice, the objectives to be used, called "immersion objectives," are optimized for the use of specific immersion liquids. A distinction is thus made between oil objectives, for which oil is used as an immersion medium; water objectives, for which water is used as an immersion medium, for example for the investigation of water-containing preparations such as living cells; and glycerol objectives, for which the immersion medium is a glycerol that is similar to the embedding medium of a corresponding preparation.

Immersion liquids are usually combined into groups, specifically in terms of different mixtures which are notable for the fact that by mixing different liquids, the optical refraction index of the immersion medium can be varied and thus adjusted.

When an immersion liquid is used, it is essential that it be located between the objective or outer lens and the preparation or specimen slide glass, in order to achieve mutual optical adaptation of the two components Immersion liquid is usually applied onto the objective lens and/or onto the specimen slide shortly before the actual experiment.

The immersion liquid is usually applied manually, with the aid of a pipette, onto the objective lens or the sample slide. This is difficult with high-resolution microscopes, however, since with these the objective focus is located very close to the objective lens, for example at a distance of 0.2 mm therefrom. The spacing between the objective lens and the sample slide will therefore be only fractions of a millimeter in the case of high-resolution microscopes, and it is not readily possible to introduce immersion liquid from outside, using a pipette, into such a narrow gap. Instead, the objective must be moved away from the sample slide before application of the immersion liquid, and then moved back toward the sample slide. This movement can be realized, for example, by pivoting the objective or moving it up and down. This makes application of the immersion liquid particularly laborious.

A further difficulty arises with automated microscopes, in which the objective is scanned automatically over the sample slide so that a large number of samples can be investigated automatically in a short time. When the sample slide is moved relative to the objective, it may happen that the immersion film detaches, and operation of the microscope is thereby disrupted. Automated microscopes are also used to acquire images of samples, for example living cells, over a long period of time. In this case the immersion medium will partially evaporate and must therefore be replenished from time to time; this is likewise laborious when done manually.

It would be particularly advantageous, however, to use an immersion liquid specifically in the context of automated high-performance microscopes, with which the use of an immersion medium is cumbersome, because of the improved image quality thereby achievable, in particular the elevated light intensity and greater resolution capability.

Regarding documents of the existing art, reference may be made purely by way of example to DE 202 05 080 U1 that describes, separately, an immersion objective having a shielding element. What is provided therein, more precisely, is a sealing ring in the form of a bellows that is arranged in the region between the objective and the specimen. It serves to receive a small quantity of immersion liquid, and retains it in the region relevant for the beam path. The shielding element holds the immersion liquid at the point where it is required, and reduces to a minimum both evaporation and the "consumption" of immersion liquid.

Reference is also made to WO 02/093232 A2. This document likewise describes the use of an immersion objective; in this case a delivery apparatus is provided for automatic delivery of immersion medium into the region between the outer surface of the sample slide and the exit lens of the objective. Concretely, the delivery device comprises a delivery tube connected to the objective, which tube conveys the immersion medium precisely into the relevant region. The tracking system necessary for this occupies a very considerable amount of space, and requires that the delivery tube extend into the region between the exit lens and the sample or sample slide. Thus not only is the known apparatus complex in terms of design, but its utilization is problematic because of the considerable physical size, specially when multiple objectives are to be made available for selection, especially in the context of automatic operation.

The known apparatus encompasses, concretely, a delivery tube that is mounted laterally on the objective and through which an immersion liquid is delivered into the vicinity of the center of the objective lens. From the exit opening of the delivery tube, the immersion liquid is then pulled by capillary forces into the gap between the objective lens and the sample slide.

To ensure that enough immersion liquid is always present, in the known apparatus the liquid is continuously delivered in excess, and excess immersion liquid is collected in a drainage channel that is provided on an objective head of the objective, and aspirated with an aspiration device.

For automatic microscopy in particular, it is advantageous if resolutions can be adapted by rapidly changing the objectives that are used. The objective change can be made manually or automatically in that context. An automatic changeover between immersion objectives, simultaneously with continued automatic delivery of immersion liquid, is not possible with any of the systems mentioned above.

In addition, it is often necessary in practical use to switch between different immersion media or immersion liquids, for example oil and water. During the switchover from one immersion liquid to another, it is therefore necessary for the particular immersion liquid being used to be removed as thoroughly as possible from the objective and the specimen slide. This has hitherto been possible only manually. The immersion liquid is usually applied manually or by way of a cumbersome gestural system. This requires considerable time, and the process of applying or introducing the immersion liquid is imprecise. It also always entails a risk of contamination, especially since some immersion media are toxic. Manual handling of the immersion media is to be avoided for this reason as well.

As stated earlier, the systems known from practical use are of only limited suitability for practical utilization in microscopy. Care must always be taken to ensure that such systems have no quality-reducing disadvantages. While the provision of a replenishment fitting in the gap between the objective and the specimen slide is inconvenient, a replenishment system attached to the objective consistently causes a torque acting on the objective. In cases where the immersion objectives are arranged in an objective turret, rotation of the objective turret is impeded by replenishment systems of this kind. All of the aforesaid disadvantages are not tolerable, especially in the context of automatic operation.

Be it noted further that when immersion liquid is used, preference is given to certain types of objective in which the lens on the specimen-slide end, i.e. the exit lens of the objective, is located closest to the specimen slide. Given the surface tension there, capillary forces are utilized in order to introduce the immersion medium into the region between the outer lens and the specimen. The utilization of capillary forces is advantageous even though they depend on numerous boundary conditions, for example on the surface tension of the components and constituents involves, in particular the surface tension of the immersion liquid and the interfacial tension of the immersion liquid with the surface of the specimen slide and the surface of the exit lens. If the surfaces that are to be thoroughly wetted with the immersion liquid are highly contaminated, for example as a result of fingerprints on the specimen slides or encrusted immersion-oil residues on the specimen slides and/or on the exit lens, it may be assumed that the necessary capillary forces will not take effect. The risk correspondingly exists that the gap between the exit lens and the specimen slide will be only incompletely wetted with immersion oil. If the relevant active optical surfaces are only partly wetted with immersion oil, this has a quality-reducing effect on the microscope images obtained.

A further quality-reducing feature is air bubbles that can occur in the gap between the specimen slide and the objective. Such air bubbles decrease the capillary forces and prevent complete wetting of the optical surfaces with immersion liquid. The creation of small air bubbles is promoted by the use of filling tubes to supply the gap with immersion liquid. The risk exists in particular at higher flow rates, which have a kind of atomization effect due to the entrainment of air.

An immersion objective is described in U.S. Pat. No. 3,202,049, in which a particular device is provided for delivering immersion liquid into the region between the specimen or a specimen slide and the outer lens (exit lens) of the objective. This device encompasses a cap, surrounding the objective body and open in the region of the outer lens, that is screwed with an internal thread onto an external thread of the objective body. The cap forms a gap toward the outer lens, a small reservoir for receiving immersion liquid being formed inside the cap. The immersion liquid can emerge from the reservoir through the gap.

Provision of the cap has the advantage that as compared with the otherwise known systems, it is physically extremely small, i.e. arranged in rotationally symmetrical fashion around the objective body. It contains a repository of immersion liquid that is kept on hand, for operation of the immersion objective, in accordance with the volume provided therein.

The known system utilizes gravity and manual rotation of the cap in order to bring about emergence of the immersion liquid from the annular gap formed between cap and objective. It is correspondingly necessary for such immersion objectives to be used exclusively in conventional fashion, specifically such that the objective "looks down" onto the sample being investigated. The known gravity-dependent immersion objective cannot be used for inverted microscopy, in which the objective "looks" from below into the specimen slide or onto the material. The known immersion objective is also not suitable for the automatic use of multiple immersion objectives, especially since continual manual adjustment of the quantity of immersion liquid to be discharged is not possible during automatic operation. Lastly, the known immersion objective has the further disadvantage that large quantities of oil build up on the preparation or slide because of constant emergences of immersion liquid. When oils are used, encrustation cannot be avoided because of constant evaporation.

SUMMARY

In an embodiment the present invention provides an immersion objective for microscopic investigation of a specimen wherein an outer lens is disposed in an objective body and further provides a delivery device including a cap. The cap is disposed over the objective body so as to form a space adapted to receive an immersion liquid and is open in a region of the outer lens so as to form a gap with the outer lens. The cap includes at least one connector configured to provide a continuous supply of the immersion liquid to the space so that the immersion liquid emerges through the gap to a region between the outer lens and at least one of the specimen and a specimen slide.

BRIEF DESCRIPTION OF THE DRAWINGS

There are various ways of advantageously embodying and refining the teaching of the present invention. The reader is referred to the explanation below of various embodiments of the invention with reference to the drawings. In conjunction with the explanation of the embodiments of the invention with reference to the drawings, an explanation will also be given of generally preferred embodiments and refinements of the teaching. In the drawings:

FIG. 5b is a schematic plan view of the subject matter of FIG. 5a;

FIG. 6b is a schematic plan view of the subject matter of FIG. 6a;

FIG. 7b is a schematic plan view of the subject matter of FIG. 7a;

FIG. 8b is a schematic plan view of the subject matter of FIG. 8a;

FIG. 9b is a schematic plan view of the subject matter of FIG. 9a;

FIG. 10c is a schematic plan view of the subject matter of FIG. 10a;

DETAILED DESCRIPTION

Figure 1:
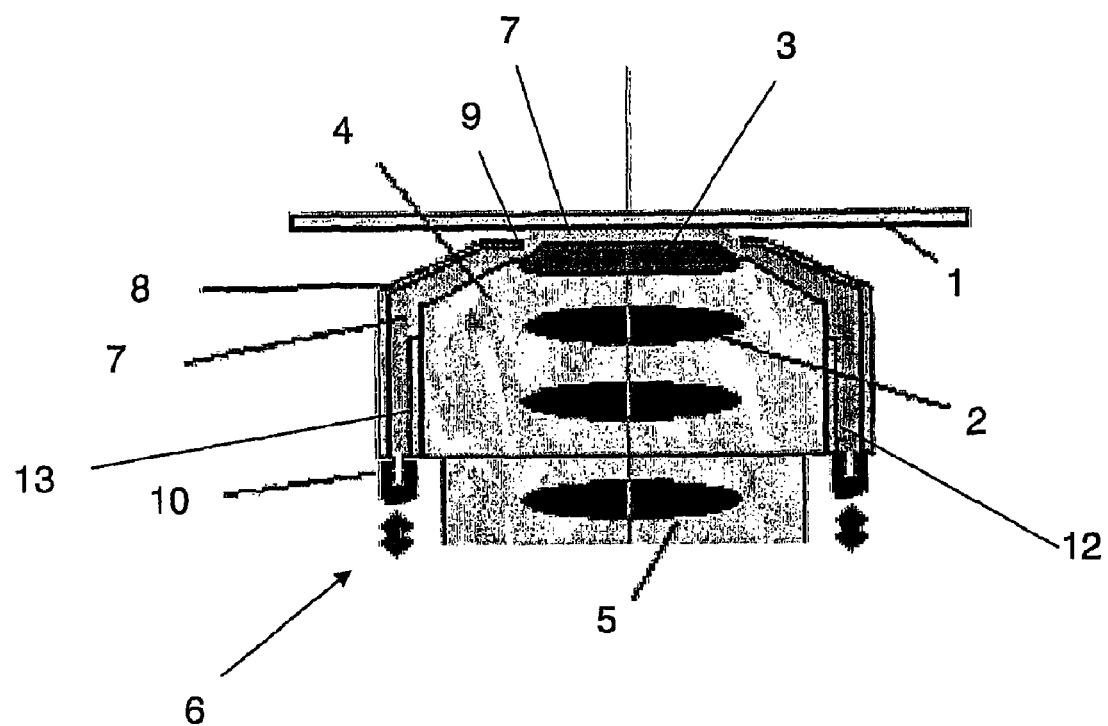
FIG. 1 is a schematic sectioned view showing a first exemplifying embodiment of an immersion objective according to the present invention in an inverted arrangement.

In an embodiment, the present invention provides an immersion objective for microscopic investigation of a specimen, having a delivery device for delivering immersion medium, in particular immersion liquid, into the region between the specimen or a specimen slide and the outer lens of the objective, the delivery device encompassing a cap, surrounding the objective body and open in the region of the outer lens, that forms a gap toward the outer lens, a space for the reception of immersion medium being formed inside the cap, and the immersion medium emerging through the gap.

It is an aspect of the present invention to configure and refine on the one hand an immersion objective and on the other hand an apparatus and a method, in such a way that a sufficiently good supply of immersion medium is provided over the entire utilization period, the intention being to enable use during automatic operation. The intention in this context is to ensure that an immersion film is automatically and reliably constituted between the lens of a microscope objective and a sample slide, even when the microscope objective and sample carrier are moved relatively rapidly relative to one another and/or when long-term investigations are being carried out on a sample.

The immersion objective according to an embodiment of the present invention includes a delivery device having at least one connector, embodied in the cap, for continuously supplying immersion medium.

With respect to the objective according to an embodiment of the present invention, it has been recognized that the problems of known immersion objectives relating to physical size can be remedied, but at least reduced, by providing around the objective an at least small repository with immersion liquid. This repository is formed inside a cap that extends around the objective body at least in the specimen-side region of the objective. Located between the cap and the objective body is a small repository that is continuously supplied with immersion medium or immersion liquid in a manner further in accordance with the present invention. For that purpose, the delivery device encompasses at least one connector, embodied in the cap, through which the continuous supply of immersion medium takes place.

Because immersion medium is being continuously supplied, it is possible to minimize the size of the space formed between the cap and between the inner wall of the cap and the outer wall of the objective body, so that the space required for the immersion objective is as small as possible. The volume formed under the cap can therefore be minimized, since a continuous supply of immersion liquid to the cap takes place, namely via the connector. A constant overpressure can correspondingly build up under the cap, causing the immersion medium to be discharged through the gap. The immersion objective according to the present invention is consequently also suitable for use in an inverted microscope, specifically for arrangement of the objective beneath a specimen or specimen slide, so that the objective "looks" into the specimen slide or onto the material from below. A dependence on gravity does not exist with the immersion objective according to the present invention.

For uniform supply of immersion medium into the region between the specimen or specimen slide and the outer lens of the objective, it is advantageous if the gap formed between the cap and the lens is embodied as a rotationally symmetrical gap. Concretely, the gap can be embodied as an annular gap. This ensures a uniform supply of immersion medium in the region around the exit lens.

It is also conceivable for channels to be recessed into the cap and/or into the objective body for the conveyance of immersion medium. The provision of such channels can promote the transport of immersion liquid, in particular utilizing capillary forces.

The cap is mounted in at least largely sealing fashion on a front region, wider in cross section, of the objective body. It is essential in this context that mounting occur in the region of the front or upper, wider, objective neck, so that the lower, narrower objective neck, which is pushed in upon contact between the objective and the specimen slide, can continue to serve without hindrance as a kind of safety buffer.

Concretely, the cap is mounted with a connecting region on the objective body. The connecting region is an integral constituent of the cap. It is advantageous if the cap is connected fixedly, and in that context rotationally symmetrically, to the objective. This can be accomplished by slipping the cap, with its connecting region, onto the objective body in positively and/or frictionally engaged fashion. It is likewise conceivable for the cap to be adhesively bonded, with the connecting region, onto the objective body. Thread-mounting of the cap, via its connecting region, on the objective body is particularly elegant. In the thread-mounting instance, an adjustment can be performed by way of the threads, or it is possible to effect, including retrospectively, exact positioning of the cap with respect to the exit lens in order to define the gap. In principle, the gap is adjusted by positioning the cap, this usually being an adjustment performed at the factory. The use of a threaded connection ensures adjustability by the user.

The purpose of adjusting the gap is to adapt to the viscosity and surface tension of the particular immersion liquid. It is conceivable in this context for an objective to be adjusted, and thus defined, a priori for a specific immersion liquid. The aforementioned adjustability that is possible on the part of the user enables adaptation to different immersion media. In any event, the gap should be adjusted, or become adjusted, in such a way that the immersion medium does not emerge from the gap without the application of pressure, so that unnecessary evaporation of immersion liquid, in particular encrustation in the edge region, is effectively avoided but is at least very considerably reduced.

The connecting region serving for connection to the objective body can be embodied as a solid ring that is an integral constituent of the cap. A particularly stable connection to the objective can be produced in this context.

According to an embodiment of the present invention, it is possible for the connecting region to be embodied as a circumferential annular channel having an inner wall directly contacting the objective body. In the context of such a configuration, connection could be effected on the (rear) side of the cap located opposite the exit lens, namely via the annular channel formed there, which can be equipped with corresponding connector fittings. Physical size could thereby be minimized.

The total installation space required can be minimized, in particular, by the fact that the cap is approximately adapted to the contour of the objective or of the objective body. Because the cap is continuously supplied with immersion liquid, the space formed inside the cap for the immersion liquid can be kept as small as possible. A circumferential annular channel is ultimately sufficient, provided immersion medium is continuously supplied from outside the cap.

It has already been mentioned above that at least one connector for the introduction and/or discharge of immersion medium is provided on the cap. In advantageous fashion, two connectors, for the introduction and/or discharge of the same immersion medium or of different immersion media, are provided on one cap, so that, for example, alternate delivery of different immersion liquids can occur. It is also conceivable for the immersion medium to be introduced through the one connector, and for immersion medium that is no longer required to be extracted through the other connector. It is also conceivable for compressed air to be blown in through one or the other connector (selectably), specifically in order to remove excess immersion medium from the channel inside the cap and from the preferably annular outlet.

As has likewise already been mentioned, the connector or connectors can be embodied on the side of the cap facing away from the outer lens. It is also possible for the connector or connectors to be embodied laterally in the cap. What is relevant here is the overall arrangement to be implemented, and the available installation space.

According to an embodiment of the present invention, the connectors are embodied in the form of connector fittings. These are connected via a line, in particular via a hose, to a reservoir containing an immersion liquid. In addition, one of the connectors can likewise be connected via a line, in particular via a hose, to a reservoir containing a flushing/cleaning liquid. It is advantageous if the cap can be supplied, in accordance with requirements, on the one hand with immersion liquid and on the other hand with a flushing/cleaning liquid, specifically in order to bring about not only automatic microscopy operation, but also subsequent automatic cleaning. A switchover to a different immersion medium after cleaning is possible.

The reservoirs serving for the reception of immersion liquid and, if applicable, of a flushing/cleaning liquid are refillable and/or entirely exchangeable, for example in the manner of a refillable or exchangeable cartridge. Placement of the reservoir directly onto or against the objective is conceivable. Attachment of the reservoir remotely from the objective is likewise possible, on the basis of a hose connection between the reservoir and the respective connector fitting.

At least one pump is provided for conveying the immersion liquid and/or the flushing/cleaning liquid; in very particularly advantageous fashion, this is a metering pump. The pump enables application of an at least slight overpressure inside the reservoir and/or inside the hose line and/or inside the cap, so that the immersion liquid emerges from the annular gap upon activation of the pump.

According to an embodiment of the present invention, a heating device is provided in order to heat the immersion liquid and/or the flushing/cleaning liquid. With respect to the immersion liquid, it possible to modify its viscosity and surface tension by way of temperature, so that optimum adaptation is possible in this respect as well. Temperature control of the flushing/cleaning liquid is favorable to the cleaning process.

According to another embodiment of the present invention, the connector or connectors is or are connected via a line, in particular via a hose, to a collection container receiving immersion liquid and/or a flushing/cleaning liquid. On the one hand immersion liquid that is no longer required, and on the other hand flushing/cleaning liquid, can be drawn into this collection container. This feature, too, is favorable for automatic microscopy operation.

According to a further embodiment of the present invention, multiple objectives equipped with caps are combined into one assembly. This can be an objective turret, preferably embodied in rotationally symmetrical fashion. In this context, the objectives should be threaded into the objective turret in such a way that the connectors are directed inward in accordance with their arrangement and alignment. This prevents any interference with the rotational movement of the objective turret.

In the context of an arrangement of the objectives in an objective turret, it is conceivable for each of the objectives to have associated with it at least one reservoir for immersion liquid and/or for flushing/cleaning liquid. Also conceivable is a central reservoir, in which case the objective turret carries at least one reservoir for making available immersion liquid and/or flushing/cleaning liquid, and/or a collection container for the reception of immersion liquid and/or flushing/cleaning liquid. Such a reservoir or reservoirs could be arranged in or at or on the objective turret, or could be integrated into the objective turret.

At least one pump, preferably in the form of a micropump, is accordingly located on or in the objective turret for the purpose of conveying fluid, so that the objective operates autonomously in that respect.

The same applies to the provision of a control system for metering the immersion liquid and/or the flushing/cleaning liquid. The control system could be arranged approximately centeredly on, at, or in the objective turret. It is likewise conceivable for the control system to encompass a microcontroller for controlling the entire process of supplying the objective with different media, and/or the sequence of desired objective changes.

It is furthermore conceivable for the microcontroller to receive external control signals and, with reference to completed method steps, to send corresponding signals out to an external unit. An external electronic control interface could likewise be provided for controlling the entire process.

According to an embodiment of the present invention, the objective turret has associated with it an electronic system for sending and receiving control signals, which serves to interrogate sensors and to apply control to the pump or pumps. The fill level in the reservoirs can furthermore be detected by means of the sensors. It is likewise conceivable, and advantageous, for the current quantity of immersion liquid at each objective to be detected directly by means of a sensor suite. Detection could be accomplished, concretely, by means of capacitative sensors, a change in the dielectric (in the form of the immersion medium) serving as a measured variable.

Valves, preferably in the form of microvalves, are additionally provided for individual supply to a particular objective. These valves can be associated with the respective line or directly with the respective cap.

In additionally advantageous fashion, the objective turret encompasses its own energy supply system, which can be a rechargeable battery or a battery. It is also conceivable for the energy supply system to encompass a power supply cable to the microscope, an electrical connection preferably being made via a wiper contact.

The aforementioned modules or functional units that are or can be associated with the objective turret can be combined into a kind of monolithic functional group, specifically into a functional group arranged in a housing, which group is in turn mounted or arranged on the objective turret, and preferably centeredly thereon between the objectives.

For use in particular in the context of 4Pi microscopy, it is advantageous if two objectives can be simultaneously selected for operation and supplied with immersion liquid. In this respect as well, the application spectrum of the objective according to the present invention can be very considerably expanded in the context of a particular arrangement.

Depending on the situation in the region between the outer lens of the objective and the specimen slide or specimen, it may be necessary to take farther-reaching actions for introduction of the immersion liquid. During manual operation, the objective is moved for that purpose with respect to the specimen slide, specifically in order to slip the immersion liquid correctly into the intervening area. In the context of automatic operation, it is advantageous if the objective in use can be moved with respect to the specimen or the specimen slide, slowly or quickly in selectable fashion, in the context of the delivery or presence of immersion liquid. Such a movement promotes wetting with the immersion liquid. It is also conceivable for the immersion liquid to be acted upon by acoustic waves, once again in order to promote wetting between the respective components.

For cleaning purposes, a further action can be taken for the promotion of automatic operation, namely an action according to which the channel, and/or the region between the objective and the specimen slide or the specimen, can be blown out with compressed air. The same applies to the connector fittings and to the line, which can likewise be blown out with compressed air and thereby cleaned. The alternate use of different immersion media is thereby possible. The compressed air required for blowing can be made available via a pressure vessel, preferably via a compressed-air cartridge, or via a compressed-air generator. Be it noted in that context that the medium serving for cleaning can be not necessarily compressed air, but instead any gas whatsoever, for example an inert gas. The use of a gas that binds or neutralizes specific substances is also conceivable.

With respect to the apparatus for constituting an immersion film of an immersion liquid between a lens, a microscope objective, and a sample slide, the underlying aspect is achieved by the fact that said apparatus encompasses an objective-mounted element that defines an immersion film region in which the immersion film is to be constituted; a sensor device that is suitable for detecting the condition of the immersion film in the immersion film region; a delivery apparatus for delivering immersion liquid into the immersion film region; and means for controlling or regulating the delivery of immersion liquid as a function of detection by the sensor device. It is also achieved by a corresponding method.

Unlike in the existing art recited above, in which the immersion liquid is delivered through the delivery tube to a point in the vicinity of the objective lens, and reliance is essentially placed on the fact that a sufficient immersion film will be constituted between the microscope objective and the sample slide as a result of capillary forces, the apparatus of the invention encompasses an objective-mounted element that defines an immersion film region in which the immersion film is to be constituted. The condition of the immersion film in this immersion film region is detected by the sensor device. In this context, what is meant by the "condition" of the immersion film is not a plurality of detailed properties of the immersion film. What is important, rather, is to be able to ascertain whether an immersion film sufficient for the purposes of immersion microscopy is present in the immersion film region. For example, if it is ascertained with the aid of the sensor device that the immersion film in the immersion film region is becoming thin or is beginning to detach, the delivery of additional immersion liquid can be authorized with the aid of the controlling or regulating means.

The immersion film between the sample slide and the objective lens is not limited to the immersion film region, but instead can also extend beyond it, for example as a result of capillary forces. The immersion film region is, however, the region in which the condition of the immersion film is checked with the aid of the sensor device. Because the immersion film region is provided in an objective-mounted element, it moreover has the further useful effect that it assists entrainment of the immersion film when the sample is moved relative to the objective, as will be explained in further detail below with reference to an exemplifying embodiment.

In an advantageous embodiment, the objective-mounted element is embodied as an adapter that is suitable for being mounted on a microscope objective. An adapter of this kind can easily be retrofitted to existing microscopes in which operation occurs at present without immersion liquid, or in which immersion liquid is applied manually.

In an embodiment, the sensor device detects the condition of the immersion film based on its electrical conductivity. For example, the electrical conductivity can be measured in a direction perpendicular to the thickness direction of the immersion film, across a portion of the immersion film region. If the thickness of the immersion film decreases locally, this can be detected by way of a decrease in conductivity. In an advantageous refinement, the controlling or regulating means authorize the delivery of immersion liquid when the conductivity of the immersion film in a direction perpendicular to its thickness direction falls below a lower threshold, and terminate the delivery of immersion liquid when said conductivity exceeds an upper threshold.

The embodiment just described assumes a conductive immersion medium, however. The inventors have determined that the conductivity of so-called deionized water is sufficient for detection as described above. If even purer water, or another, nonconductive immersion liquid is to be used, however, the sensor device must respond to other properties of the immersion film. In an alternative embodiment, for example, the sensor device can detect the condition of the immersion film based on its inductive and/or capacitive effect in an alternating electromagnetic field.

In an advantageous refinement, the sensor device further encompasses an apparatus for measuring the temperature of the immersion liquid. By way of the temperature, the measured values of the sensor device can be corrected or scaled. For example, the conductivity of liquids is a function of their temperature. In order to allow the condition of the immersion film to be deduced even more reliably from a measured conductivity, it is advantageous also to sense the temperature, and to compensate for or calculate out the temperature-related influences on the measurement result.

In an advantageous refinement, the objective-mounted element encompasses a plate, and the immersion film region is formed by a cutout in the plate. Because the plate is objective-mounted, the immersion film is held in the cutout of the plate, and thus in the region of the objective lens, when the sample slide is moved relative to the objective, as is the case e.g. during sample scanning or so-called "screening." This is a considerable improvement as compared with an embodiment in which the immersion film is held between the objective lens and the sample slide merely by capillary force.

The plate is preferably made of an electrically nonconductive material, in particular plastic, a ceramic, or Teflon. A plate that is made of a circuit-board material, in particular of glass-fiber fabric and epoxy resin, is particularly advantageous. Such circuit boards are mass-produced products and therefore obtainable economically. In addition, electrodes and/or leads of the sensor device can easily be constituted, in conventional fashion, on circuit boards.

In an advantageous refinement, the delivery apparatus encompasses a channel that is embodied in the plate and communicates with the cutout. The channel can be formed by a groove in the plate, which groove is covered by a further plate. Integration of the channel into the plate yields a very flat configuration that is particularly advantageous for high-performance microscopes, in which a very small spacing between the objective and the sample slide must be maintained.

In an advantageous refinement, the conveying direction of the delivery apparatus is reversible, so that immersion liquid can be removed from the immersion film region. This can be advantageous, for example, for aspirating the immersion liquid when it is ascertained, with the aid of the sensor device, that too much immersion liquid has been delivered. Additionally or alternatively, the conveying direction can be reversed in order to draw off most of the immersion liquid before the objective is removed from the sample slide, in order to prevent contamination of the microscope with immersion liquid.

FIG. 1 shows a first exemplifying embodiment of an immersion objective according to the present invention for microscopic investigation of a specimen, only specimen slide 1 being shown, for the sake of simplicity, with regard to the specimen. Corresponding objectives can be used, for example, in fluorescence microscopy, bright field microscopy, dark field microscopy, phase contrast microscopy, etc. An immersion medium is used in order to improve the optical transition between the objective and a preparation or specimen slide 1.

FIG. 1 is a schematic depiction of the objective, inner lenses 2 being merely indicated therein. Outer lens 3 is positioned opposite specimen slide 1. Outer lens 3 is also called an "exit lens." Lenses 2, 3 are arranged inside an objective body 4.

It is also apparent from FIG. 1 that the objective encompasses a lower, narrower objective neck 5 that serves as a safety buffer upon contact with specimen slide 1. It is possible for the two regions of the objective to slide at least slightly inside one another.

A delivery device 6 serves to deliver immersion liquid 7 into the region between specimen slide 1 and outer lens 3; delivery device 7 encompasses a cap 8 that surrounds objective body 4 and is open in the region of outer lens 3. Cap 8 forms, toward outer lens 3, a gap 9 that is embodied as an annular gap in the exemplifying embodiment shown here. Immersion liquid 7 emerges from cap 8 through gap 9.

According to the present invention, delivery device 6 encompasses at least one connector 10, embodied in cap 8, which is embodied concretely as a connector fitting for connection of a hose. It serves to deliver and remove immersion liquid 7.

FIG. 1 further shows that cap 8 has a connecting region 11, forming in itself an annular channel 12 that serves for the delivery of and as a reservoir for immersion liquid 7. An inner wall 13 of cap 8 serves for direct abutment against objective body 4. In the exemplifying embodiment selected here, cap 8 is pressed with connecting region 11 onto objective body 4, heat-shrinking being advantageous. To avoid repetition, reference is made to the general portion of the description with regard to further mounting possibilities.

Figure 2:
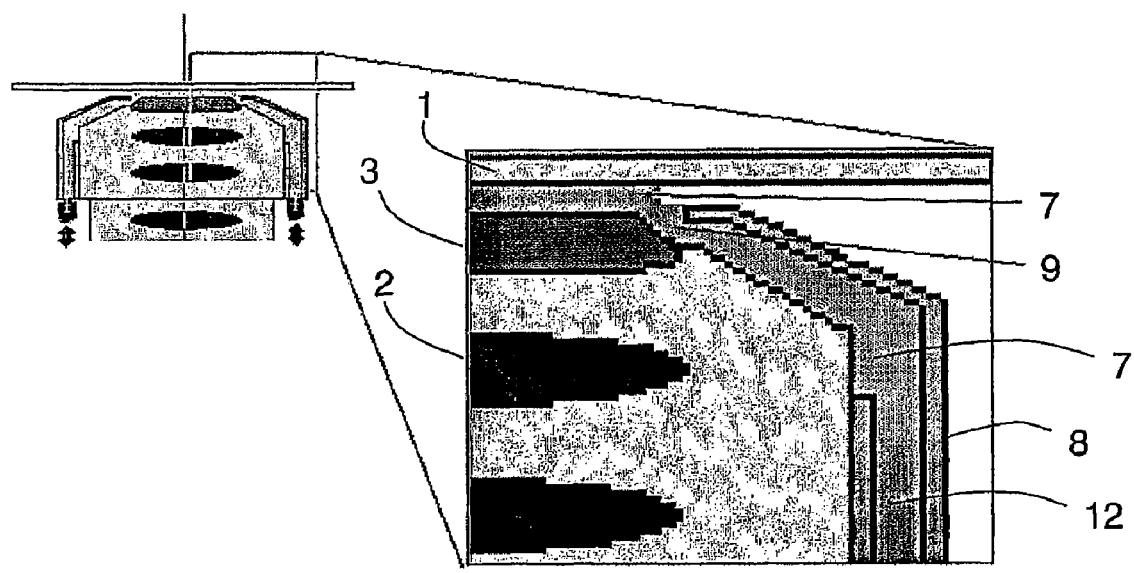
FIG. 2 is a enlarged partial view of the subject matter of FIG. 1.

FIG. 2 shows the subject matter of FIG. 1 in an enlarged partial view. Indicated therein is the fact that because of the influence of surface tension and interfacial tension in the region of annular gap 9, a kind of internal bevel is constituted between immersion liquid 7 and specimen slide 1.

FIG. 2 further indicates that annular gap 9, or the gap width therein, is adjustable by way of the positioning of cap 8 in such a way that an equilibrium is established between the surface tension of immersion liquid 7 and the interfacial tension of the surroundings (glass of outer lens 3 and metal of cap 8), so that emergence of the immersion medium without pump pressure is at least largely prevented.

Figure 3:
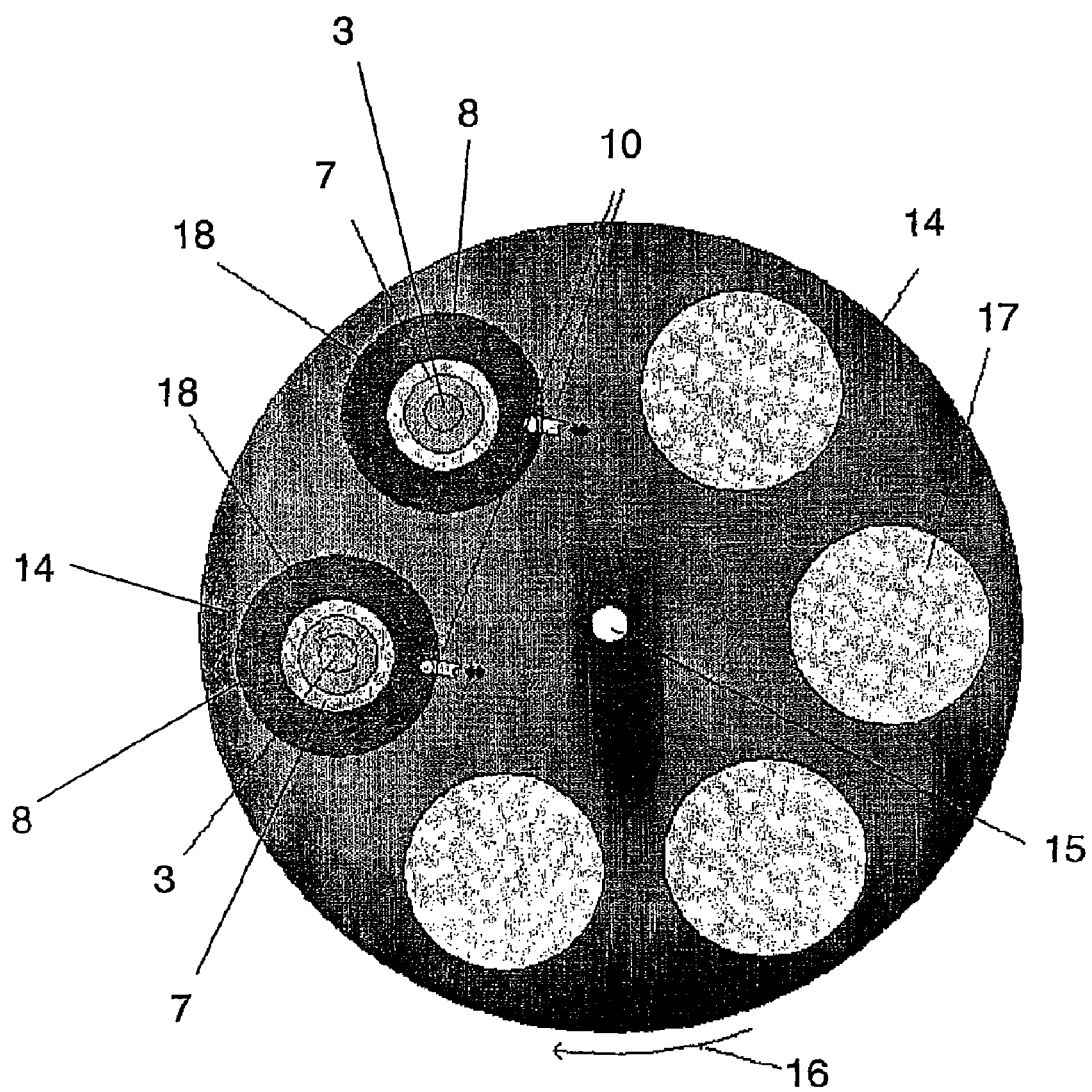
FIG. 3 is a schematic plan view of an objective turret having two inserted immersion objectives according to the present invention.

FIG. 3 shows a particular exemplifying embodiment for the use of immersion objectives according to the present invention, namely in an arrangement in an objective turret 14. Such an arrangement takes into account the fact that multiple objectives are often used in microscopy. The use of multiple different objectives serves, for example, to achieve different resolutions. To allow a changeover between objectives, multiple objectives (in this case, immersion objectives) are located in objective turret 14. The latter is embodied in rotationally symmetrical fashion.

FIG. 3 furthermore indicates that objective turret 14 comprises a central hole that serves as a rotation point for objective turret 14. The rotation direction of objective turret 14 is indicated by arrow 16. Objective turret 14 is rotated when an objective changeover is desired.

FIG. 3 further shows that a total of six receptacles 17 for the insertion of objectives are provided in objective turret 14. Two immersion objectives 18 are inserted, immersion objectives 18 being equipped with a corresponding cap 8 as a constituent of a delivery device 6. It is furthermore evident from FIG. 3 that cap 8 comprises a connector fitting 10 for the introduction of immersion liquid 7.

The plan view selected in FIG. 3 shows outer lens 3 of the objective, this lens 3 being surrounded by immersion liquid 7. Immersion objectives 18 are each equipped with cap 8, and can be threaded into a corresponding internal thread of receptacle 17 by way of an external thread provided on cap 8. Connector fittings 10 for the delivery and withdrawal of immersion liquid 7 are arranged so that they project into the inner region of objective turret 14. An inwardly directed connector is therefore possible.

Figure 4:
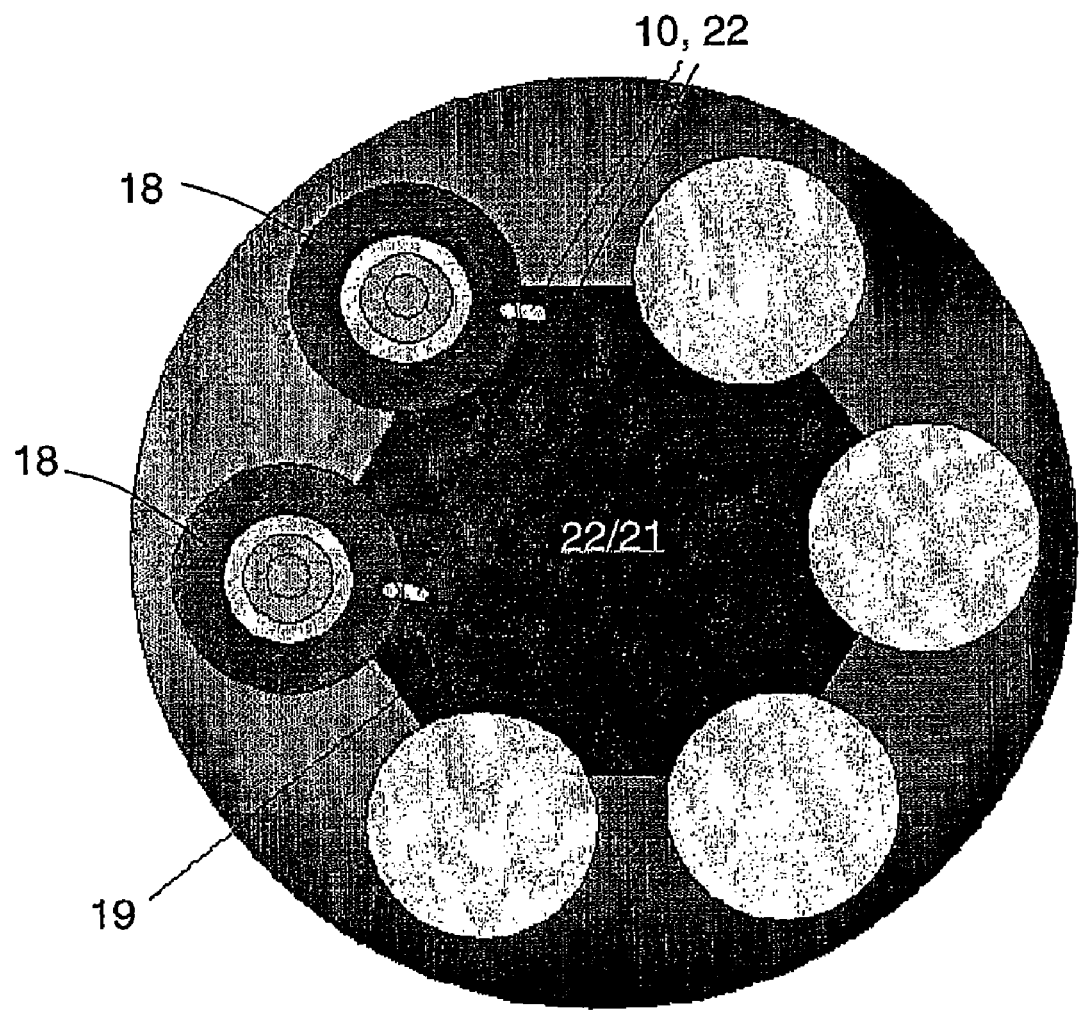
FIG. 4 is a schematic plan view of the subject matter of FIG. 3, supplemented with a control system and reservoir system arranged centeredly therein.

FIG. 4 is a schematic plan view showing the objective turret of FIG. 3, a functional unit 19 being arranged there inside objective turret 14. Immersion objectives 18 are connected via connector fittings 10 to functional unit 19, said functional unit 19 encompassing, inter alia, a control system 20 and a reservoir 21 for immersion liquid 7. Connection is effected via hose connections 22.

As already stated in the general portion of the description, functional unit 19 can encompass its own energy supply system, for example in the form of a rechargeable battery, a battery, or else a connector cable to the microscope having corresponding wiper contacts. Functional unit 19 can likewise encompass an electronic system for applying control to small pumps that serve to convey the immersion liquid.

An integrated electronic system serves to send and receive control signals that are furnished by sensors upon interrogation, and that serve for the conveyance of immersion liquid.

At least one micropump serves for the conveyance of at least one type of immersion liquid. Microvalves serve for individual selection of an objective that is to be supplied with immersion liquid. A reservoir chamber for immersion liquid, embodied to be as small as possible, can be exchangeable and/or refillable. The cap is embodied with a connector fitting through which it, and thus the immersion objective, can be supplied with a sufficient quantity of immersion liquid.

Functional unit 19 that has already been mentioned earlier encompasses, inter alia, a control system 20 that can in turn have associated with it a microcontroller for controlling the entire process. External control is also possible, namely control via an external electronic interface. It is also possible for a partly autonomous microcontroller on board functional unit 19 to be supplemented with external control commands.

The delivery and extraction of any desired immersion liquid to and from an objective can be controlled in the context of the external control system. It is also conceivable for immersion liquids to be delivered and pumped off synchronously, i.e. at two freely selectable objectives. This is important in particular for a 4Pi arrangement.

Regular interrogation of the current status occurs, for example interrogation of the fill level in reservoir 21. The current quantity of immersion medium present in the objective can also be interrogated via sensors.

The control system furthermore contains a communication interface that communicates with functional unit 19, preferably wirelessly, for example via Bluetooth, WLAN, or also via cable.

Manual delivery and extraction of immersion liquid is also conceivable. The external control system can furthermore encompass a general programming interface (GPI) for connection to a software and thus to a PC as desired. The control system also contains a general programming interface (GPI) for connection to a hardware interface, for example to a touch screen, so that any desired user inputs are possible.

The entire system can be controlled by software or manually. In the case of software control, a particular control interface is provided for user inputs, for selecting an objective, for addition of a predefined quantity of immersion liquid, for pumping off a predefined quantity of immersion liquid, and for a timer setting to replenish a certain quantity of evaporated immersion liquid. In the context of process selection, an automatic adjustment is accomplished by way of immersion liquid, regularly upon an objective change. Provision is also made for special movements, in particular circular movements, between the microscope stage and objective in order to reduce bubble formation in the immersion liquid, and to promote wetting.

Figure 5A:
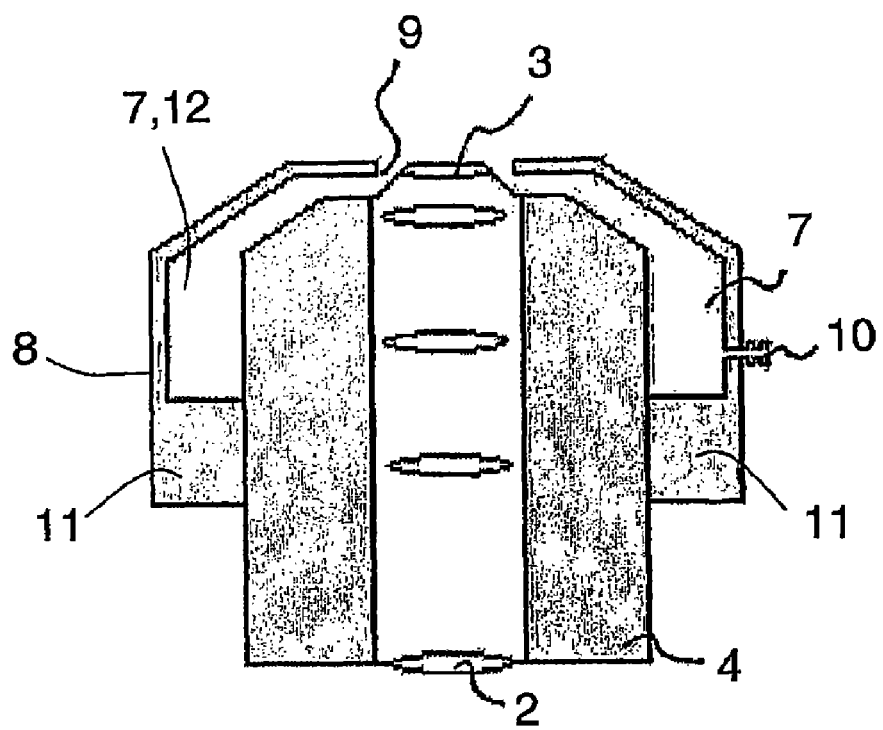
FIG. 5a is a schematic sectioned view of a further exemplifying embodiment of an immersion objective according to the present invention.
Figure 5B:
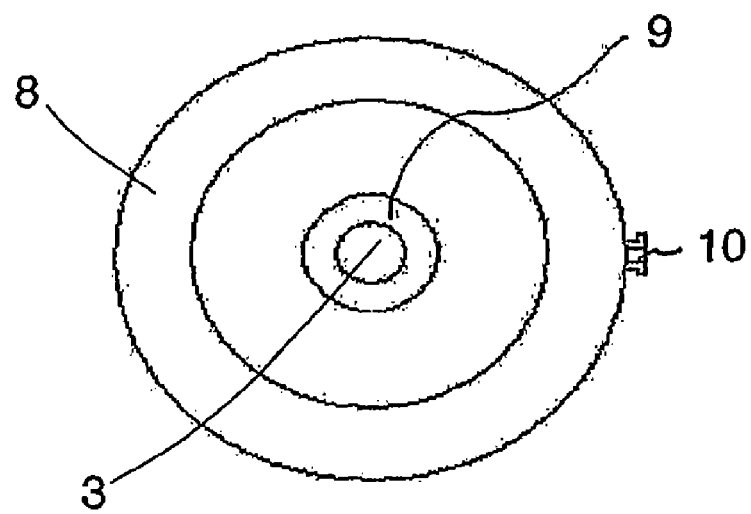

FIGS. 5a and 5b show a further exemplifying embodiment of an immersion objective in which cap 8 encompasses a connecting region 11 made of solid material. Cap 8 is made entirely of metal, which is advantageous in terms of combination with a temperature-controlled climate chamber. The reason is that cap 8 very quickly assumes the temperature of the climate chamber, and the temperature is conveyed by thermal conduction into immersion liquid 7 present in the interior of cap 8. The temperature of immersion liquid 7 can thus be kept constant.

As shown in FIG. 5a, the correspondingly milled or otherwise shaped cap 8 is slipped onto objective body 4. Objective body 4 serves as a retainer of or for the reception of cap 8. In accordance with the embodiment shown in FIG. 5a, the optical configuration of lenses 2, 3 is not disrupted or even modified by the presence of cap 8, so that a corresponding cap 8 can also be attached at a later time onto an existing objective or onto a corresponding objective body 4.

Cap 8 abuts in sealing fashion against the outer surface of objective body 4, so that a mechanically and optically fixed connection occurs between cap 8 and objective body 4. A small annular cavity or annular channel 12, which contains immersion liquid 7, is formed between objective body 4 and cap 8.

A further volume of immersion liquid 7 is conveyed into annular channel 12 via connector 10, with the result that immersion liquid 7 is conveyed toward annular gap 9. Annular gap 9 extends concentrically around outer lens 3. Immersion liquid 7 emerges through annular gap 9 in order to fill up the region between outer lens 3 and the specimen slide.

When suction occurs, or a negative pressure is applied, through connector fitting 10, the immersion liquid is drawn back toward the reservoir. The result is that in controlled and defined fashion, immersion liquid can be conveyed into the region of outer lens 3 by pressure, or removed or drawn back from that region by negative pressure.

The size of annular gap 9 is to be dimensioned so that the interfacial tension at the objective and the surface tension of the immersion liquid can be used to prevent unintentional runoff of immersion liquid. The immersion liquid accordingly can be replenished or withdrawn only in controlled fashion, using pressure or suction.

FIG. 5b shows the subject matter of FIG. 5a in a plan view.

Figure 6A:
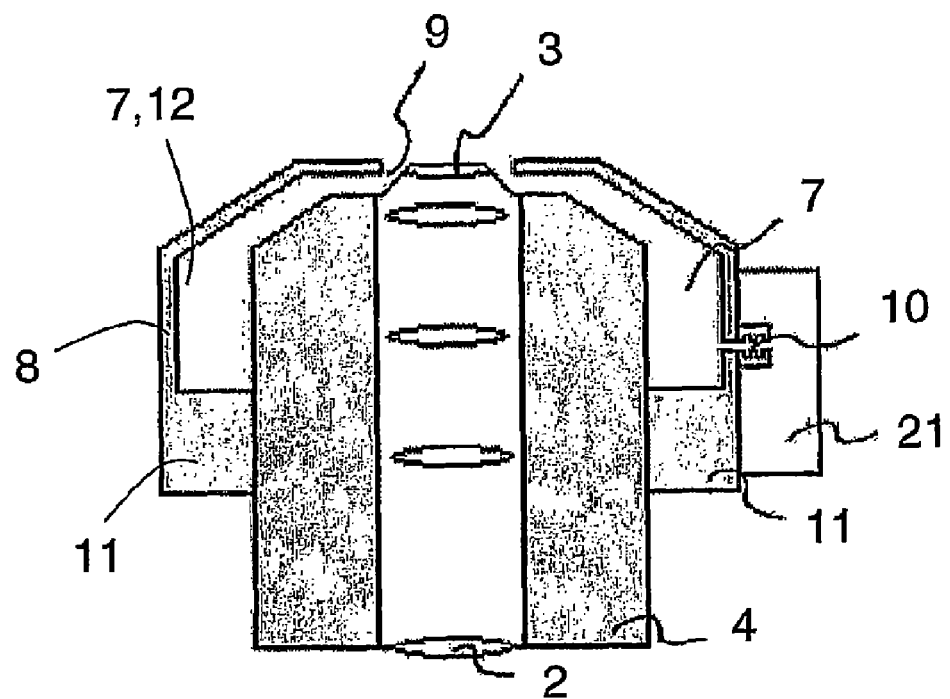
FIG. 6a is a schematic sectioned view of a further exemplifying embodiment of an immersion objective according to the present invention.
Figure 6B:
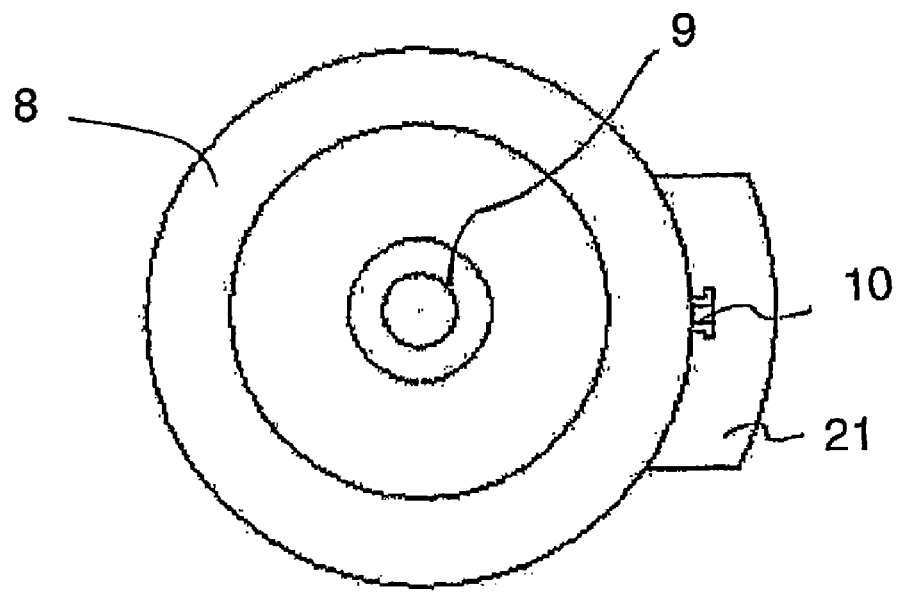

In the exemplifying embodiment shown in FIGS. 6a and 6b, a reservoir 21 is provided on cap 8, said reservoir 21 being embodied as a slip-on tank. Reservoir 21 sits directly on connector fitting 10, so that a hose connection is not necessary. Reservoir 21 is preferably equipped with a flexible outer casing. Inward pressure on the outer casing causes immersion liquid 7 to be pushed outward through annular gap 9. When the pressure on the flexible outer casing of reservoir 21 is relaxed, the elasticity of the outer casing causes immersion liquid to be drawn back.

Figure 7A:
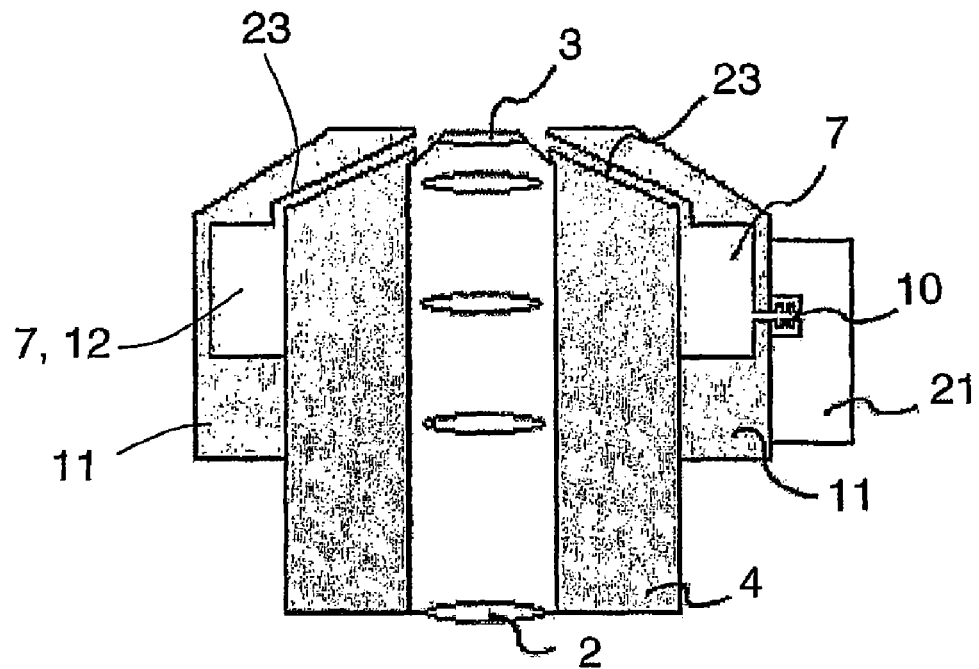
FIG. 7a is a schematic sectioned view of a further exemplifying embodiment of an immersion objective according to the present invention.
Figure 7B:
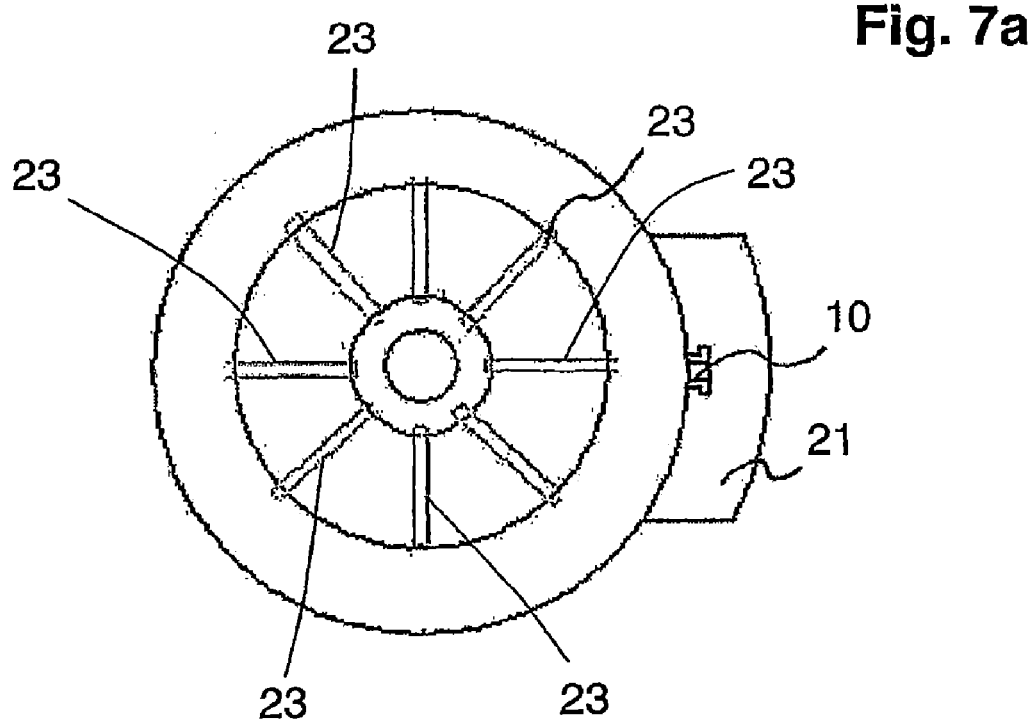

In the exemplifying embodiment shown in FIGS. 7a and 7b, the function of the sweat glands in human skin is approximately imitated. Specifically, immersion liquid 7 is conveyed out of reservoir 21 through thin orifices 23 into the vicinity of outer lens 3, where it emerges as small "beads." The outlet, otherwise embodied as annular gap 9, is thus made up of the totality of orifices 23 that carry immersion liquid 7 into the region around outer lens 3. The size of the "beads" can be varied by pressure and suction, so that more or less immersion liquid 7 can be delivered or pumped off.

An apparatus corresponding to FIGS. 7a and 7b has the advantage that only a very small quantity of delivered or discharged immersion liquid 7 needs to be handled, thus making the system precisely controllable. In addition, because immersion liquid 7 is extruded in beads, the evaporation surface area is smaller than with the conventional annular gap 9. The reservoir provided inside cap 8, or annular channel 12 therein, therefore cannot readily dry out, which is once again advantageous. This applies in particular when the immersion liquid is water, and when working at elevated ambient temperatures.

Figure 8A:
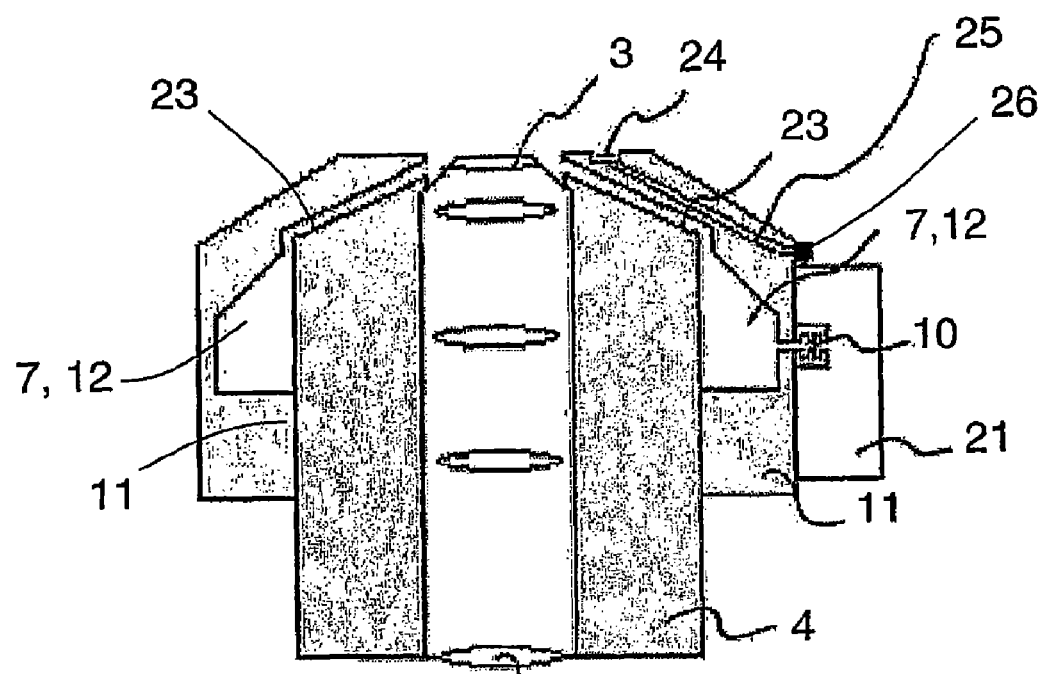
FIG. 8a is a schematic sectioned view of a further exemplifying embodiment of an immersion objective according to the present invention.
Figure 8B:
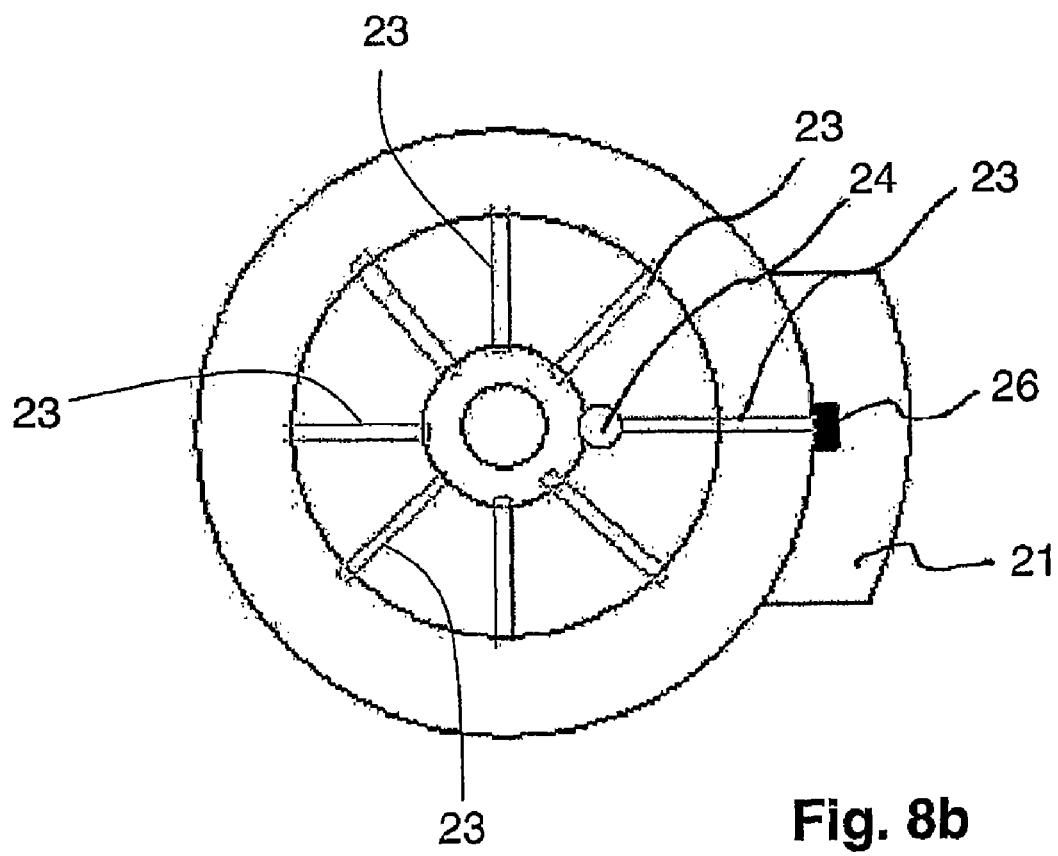

FIGS. 8a and 8b show a further exemplifying embodiment of an immersion objective according to the present invention; here a sensor 24 is provided which should be arranged as close as possible to outer lens 3. Sensor 24 is connected via a cable connection 25 to a connector device 26. From there the sensor status can be interrogated via an external measurement electronic system.

Sensor 24 is preferably embodied as a photocell, which exploits a phenomenon according to which the reflection of light at a glass surface is reduced when the glass surface (i.e. specimen slide 1) is properly wetted with immersion liquid 7. Without immersion liquid 7, a greater proportion of scattered light may be expected than when immersion liquid 7 is present, so that the measured signal spontaneously decreases as soon as immersion liquid 7 arrives in the region between sensor 24 and specimen slide 1.

A further sensor type that might be possible is a sensor measuring electrical conductivity, especially when water is used as an immersion liquid. With oils, only a low level of conductivity, and correspondingly also a small change in conductivity, may be expected. In this case a capacitative sensor could be used, which utilizes the dielectric constant of the immersion oil to measure, by way of a change in capacitance, the degree of wetting with immersion liquid.

Figure 9A:
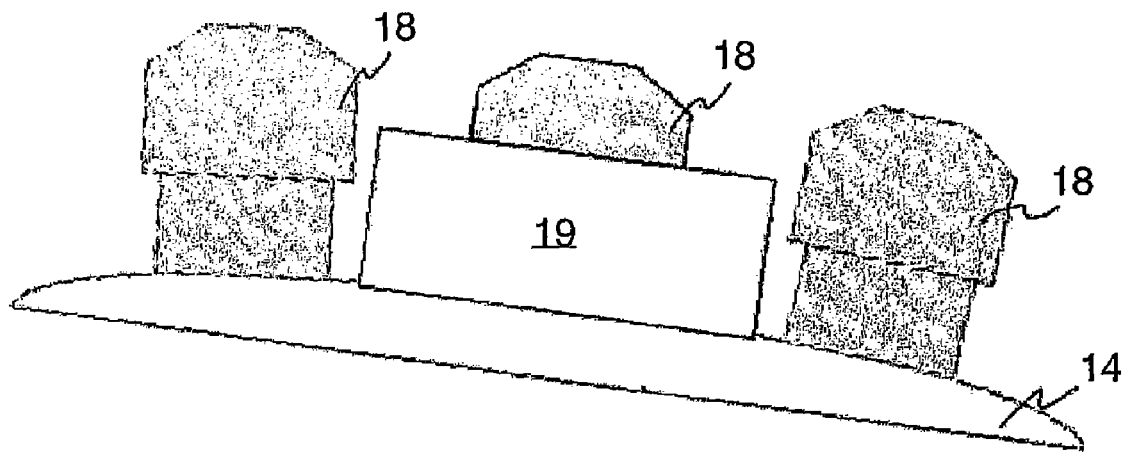
FIG. 9a is a schematic partial view of an objective turret having immersion objectives according to the present invention, in addition to electronics, pumps, and a reservoir as an integrated functional group.
Figure 9B:
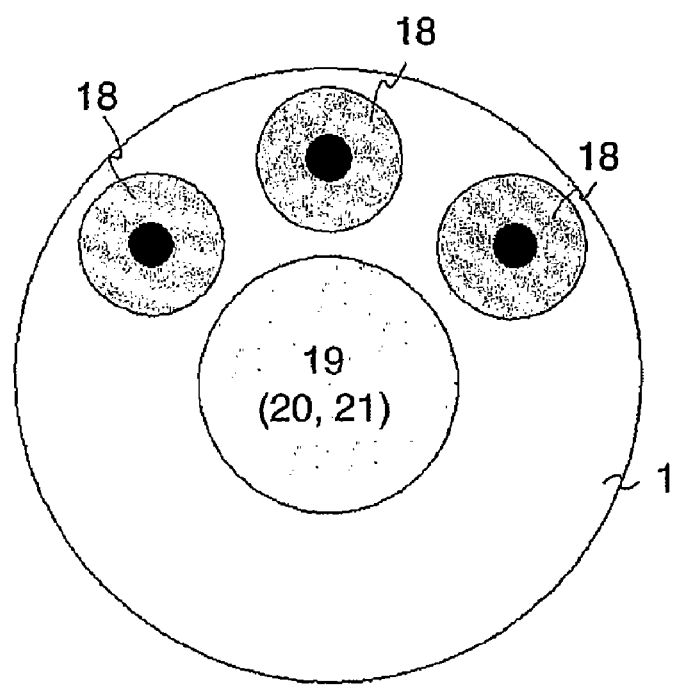

FIGS. 9a and 9b show the arrangement of immersion objectives 18 according to the present invention in or on an objective turret 14. A functional unit 19 is provided centeredly on objective turret 14. This functional unit 19 encompasses a control system 20 as well as a reservoir 21 for immersion liquid 7.

Objective turret 14 serves, concretely, to receive multiple immersion objectives 18 that are located, when in use, on the outer periphery of the rotationally symmetrical objective turret 14. The rotational symmetry enables a changeover between immersion objectives 18. This is exploited, according to the present invention, in order to enable a changeover in the context of automatically operated immersion objectives 18. The same is also true with regard to the attachment of functional unit 19 at the center of objective turret 14, functional unit 19 being accommodated correspondingly in a housing that is round in cross section and to that extent rotationally symmetrical.

The specific nature of control system 20 contained in functional unit 19 enables, for example, remote control of the system, in particular for controlled delivery and removal of immersion liquid. A further advantage of using an objective turret is that existing microscopes can be retrofitted with this technology; that retrofitting refers both to the individual objectives in terms of attaching a cap for supplying immersion medium, and to equipping the objective turret with corresponding immersion objectives 18.

Figure 10A:
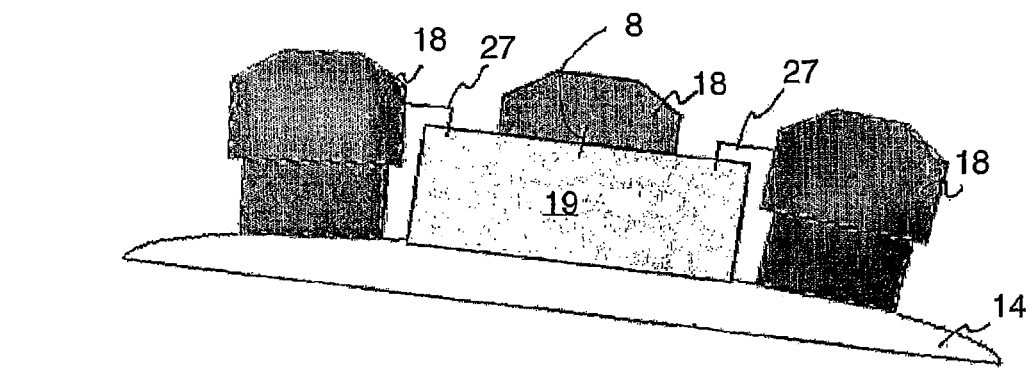
FIG. 10a is a schematic partial view of a further exemplifying embodiment of an objective turret having immersion objectives according to the present invention, in addition to electronics, pumps, and a reservoir as an integrated functional group.
Figure 10B:
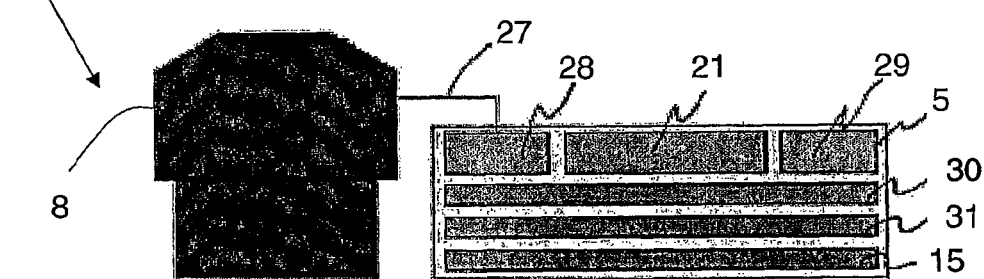
FIG. 10b is a schematic view in detail of the subject matter of FIG. 10a, showing only one immersion objective with the functional group serving for supply and control.
Figure 10C:
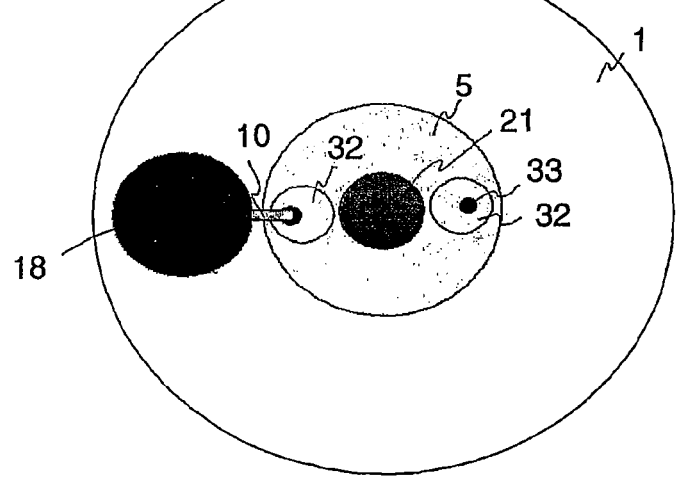

FIGS. 10a to 10c once again show the arrangement of immersion objectives 18 according to the present invention; FIG. 10b shows the general construction of functional unit 19 and of control system 20 contained therein.

Immersion objectives 18 that are located on objective turret 14 are connected to the central control system 20 via either rigid or flexible tubing lines 27, and can thereby be supplied with immersion liquid 7. Further necessary assemblies are provided in functional unit 19 to ensure that the goal of controlled delivery and removal of immersion liquid is achievable. These assemblies are depicted schematically in FIG. 10b.

Assemblies 28 and 29 are to be understood as conveying systems that can contain pumps, valves, etc. By means of these assemblies 28, 29, the requisite quantity of immersion liquid is conveyed out of the reservoir to the respective immersion objectives 18. A particular module 20 that represents a communication interface is provided for use of an external control unit to monitor the quantity of immersion liquid conveyed, and also to monitor the conveying direction. This communication interface preferably operates wirelessly. A further module 31 handles actual control of the pumps and valves of the central control system 20. Control system 20 receives corresponding instructions via module 30 that handles communication, and sends corresponding instructions via module 30, in the form of result reports or the like, to an external control unit (if the latter is provided). Completely internal control is also possible. In any event, a control loop can be created in this fashion between module 31 that provides control, module 30 responsible for communication, and an external control system.

Immersion objectives 18 are brought together via corresponding connector lines, preferably via flexible and reversibly connected connector lines, with a conveying system 32 in which the lines that convey the immersion liquid are connected to corresponding contact fittings or connector fittings 10. Contact fitting 33 is a connector fitting in or on functional unit 19 or in control system 20.

Figure 11A:
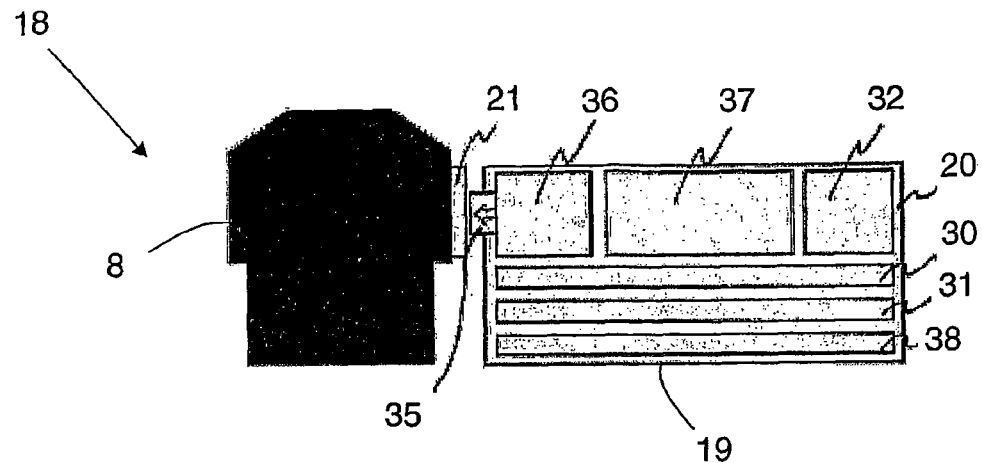
FIG. 11a is a schematic view of an exemplifying embodiment of an immersion objective with a functional group associated therewith.
Figure 11B:
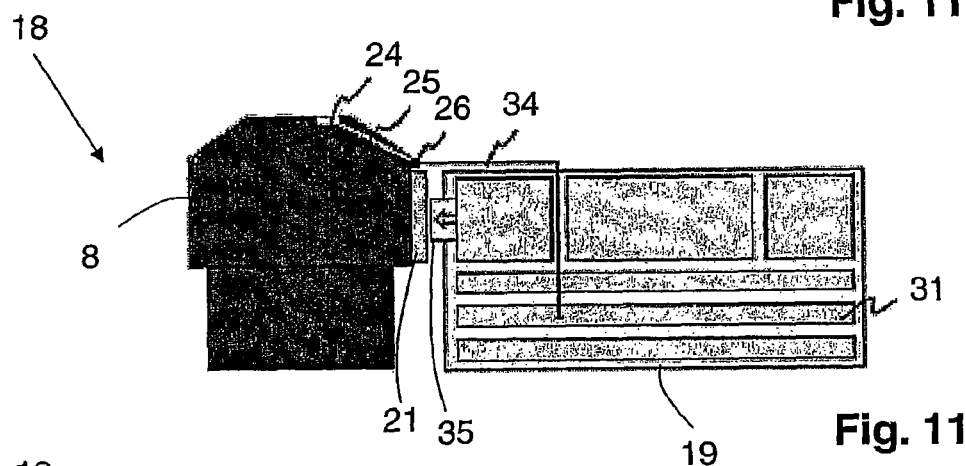
FIG. 11b is a schematic view of a further exemplifying embodiment of an immersion objective with a functional group associated therewith.
Figure 11C:
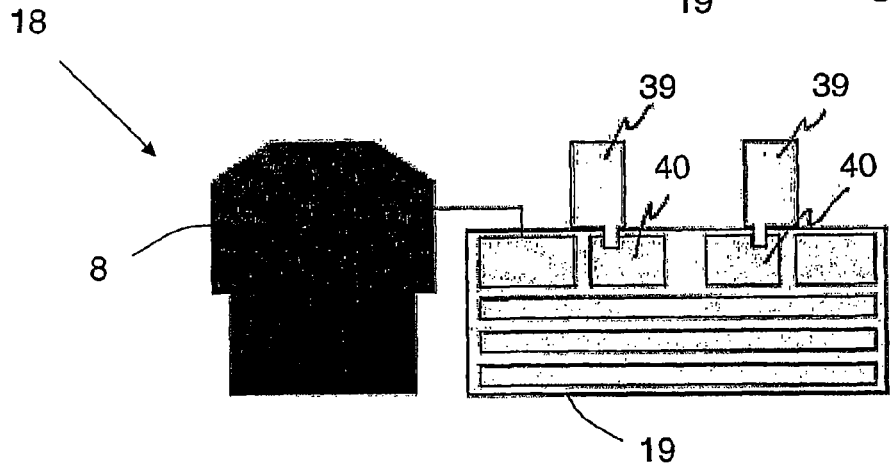
FIG. 11c is a schematic view of a further exemplifying embodiment of an immersion objective with a functional group associated therewith.

FIGS. 11a, 11b, and 11c show further exemplifying embodiments having various functional units 19.

In the exemplifying embodiment shown in FIG. 11a, caps 8 surrounding the objectives are equipped on their outer casing with a reservoir 21 that is slid on as a tank. The immersion liquid contained in reservoir 21 can be compressed as a result of pressure onto the flexible outer casing, and pumped into the cap by way of the pressure thus exerted. A pressing device 35, which acts externally on the flexible outer casing of reservoir 21, is provided for the automatic application of pressure. As soon as pressure on the flexible outer casing is relaxed, the elasticity of the flexible outer casing of reservoir 21 provides a suction, so that the immersion medium is pumped off again. Pressing device 35 is controlled accordingly.

This can be achieved, concretely, by the fact that in functional unit 19 or in control system 20, conveying system 32 contained therein acts on an extensible pressure plunger of pressing device 35, which plunger is arranged so that it presses onto the flexible outer casing of reservoir 21. Immersion liquid is thereby transported in the cap and pushed toward the outlet. By extending and retracting the pressure plunger, i.e. by actuating pressing device 35, it is possible to exert on the immersion liquid a pressure and suction that are produced by exploiting the elasticity of the flexible outer casing of reservoir 21. In the context of such a configuration, a complete separation exists between the immersion liquid and the actual transport system 32, so that no contaminants can get into the immersion liquid from outside, for example from transport system 32.

A sensor 36 serves to determine the fill level of immersion liquid 7 at regular intervals.

In the exemplifying embodiment shown in FIG. 11b, a sensor 24 is once again provided; this can be embodied as a photodetector, a capacitative sensor, or a conductivity sensor. Sensor 24 serves to detect the degree to which the objective or the outer lens is wetted with immersion medium. When a photosensor is used, this exploits the fact that the quantity of light reflected at the specimen slide decreases when a suitable immersion medium is used. Because the photosensor measures the quantity of reflected light, a decrease in the measured light intensity means either that no reflective surface is present opposite the objective (for example because the objective is too far away from the specimen slide), or that no immersion medium has been introduced between the objective and the specimen slide. In the first aforesaid instance, other measurement principles can also be implemented. For example, it is possible to measure approximately the distance of the objective from the specimen slide. This can be accomplished using a noncontact clearance sensor. In the second case, what is exploited is the fact that a decrease in intensity means that an immersion medium has penetrated and has reduced the quantity of light reflected at the glass surface of the specimen slide.

Control lines 34 of sensor 24 are preferably guided outward in the interior of the cap, specifically so that the entire system can be easily cleaned. They terminate at an insertion contact, embodied to be as small as possible, that serves as a connector device 26. Sensor 24 is connected via connector device 26, for example via a cable connection 25, to electronic control unit 30, where evaluation of the sensor data takes place. Pressing device 35 is actuated or released in accordance with the evaluation, so that immersion liquid is either conveyed or drawn back.

In the exemplifying embodiment shown in FIG. 11c, functional unit 19 is additionally equipped with a slip-on tank 39 that is inserted respectively into an internal receiving unit 40.

Figure 12:
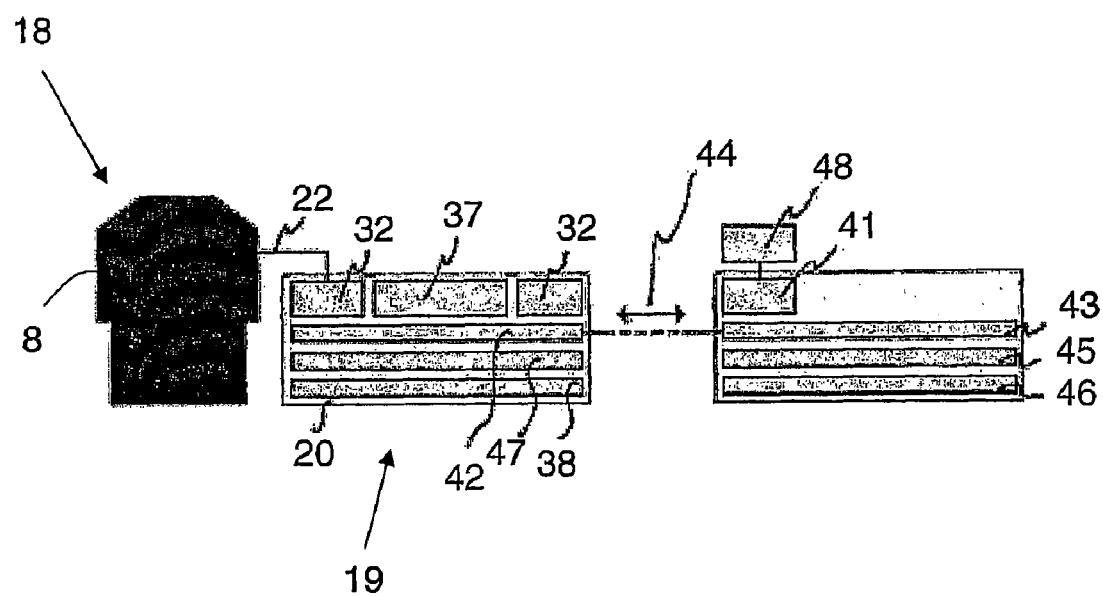
FIG. 12 is a schematic view of a further exemplifying embodiment of an immersion objective according to the present invention having an additional external control unit.

In the exemplifying embodiment shown in FIG. 12, an external control system 41 is provided. This control system 41 serves to monitor the central control unit that is associated with functional unit 19. External control system 41 is connected to functional unit 19, and to control system 20 provided therein, via suitably embodied communication layers 42, 43, which are interconnected via data line 44 or correspondingly via radio. All standardized methods for data transfer can be used, for example WLAN, Bluetooth, radio protocols, etc. Radio control enables unrestricted rotation of objective turret 14, since there is absolutely no impediment due to connector cables, and cable twisting is thus eliminated. The communication interface contains, in particular, a Web interface that enables control via Web sites, in particular via an intranet using a browser. External users can also be appropriately informed as to system status.

All control and regulation tasks can be handled, in external control system 41, by a particular control plane 45, while energy is made available via a layer serving that purpose. The modular construction thus implemented allows the use of firmware layers both in functional unit 19 or the central control system 20 therein, and in external control system 41. The firmware sits, in each case, individually on the corresponding communication layers 42, 43 and/or on the two control planes 47 and 45. Thanks to the separation, firmware updates can be fed specifically into the communication layer, thus ensuring interaction of the units. Simultaneous updating of the corresponding communication layers 42, 43 is thus possible.

In addition to a software control interface that is connected to communication layers 32, 43 and enables control of the various functions using a PC, manual control is also possible. An external user terminal 48 is provided for this purpose, in the form of an input device encompassing a screen, a keyboard, and/or a touch screen. User terminal 48 is connected to a control interface within external control system 41. In the simplest case, the external user terminal can be embodied as a series of keys that enable control of the immersion liquid and provide corresponding feedback via, for example, an LED. It is preferable for a touch screen to be provided, which receives user inputs and outputs system status data in processed form. The control interface within external control system 41 is of universal configuration, so that it is possible in principle to connect existing hardware, for example a PDA, to the system.

Figure 13:
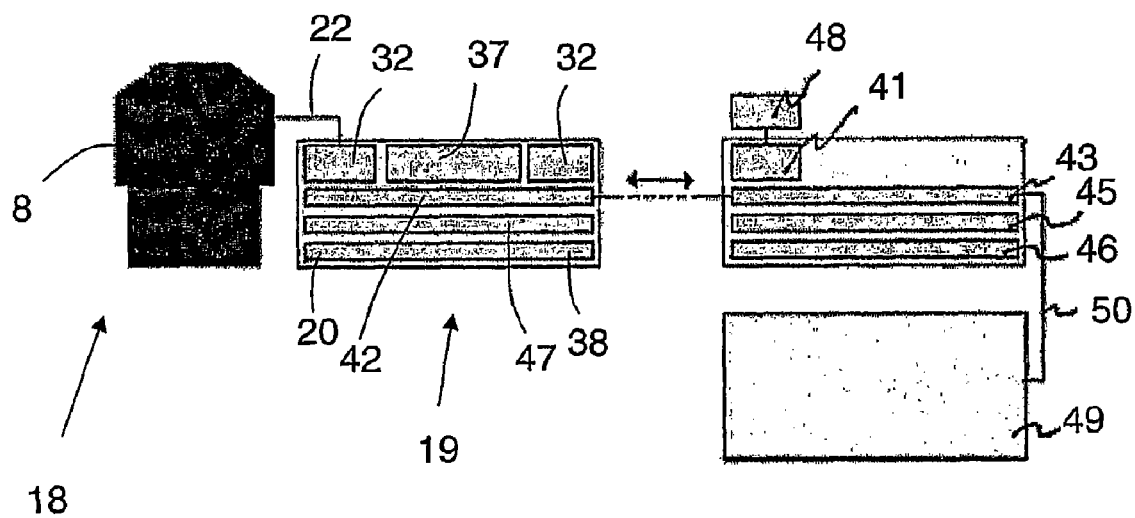
FIG. 13 is a schematic view of a further exemplifying embodiment of an immersion objective having an additional external control unit, a PC being provided for controlling the external control unit.

FIG. 13 expands on FIG. 12 by showing connection of a PC 49. PC 49 is connected to external control system 41 via a data line 50, a wireless interface, or a Web interface. To avoid repetition, reference is otherwise made to the statements relevant to FIG. 12.

FIG. 14 illustrates the execution of a special, software-assisted method that can reliably prevent the formation inside immersion liquid 7 of air bubbles that degrade image quality, in accordance with the statement from the general part of the description. Provision is also made, in accordance with the method according to the present invention, for uniform immersion wetting of the gap that is constituted between the objective and the specimen, preferably the specimen slide.

Figure 14A:
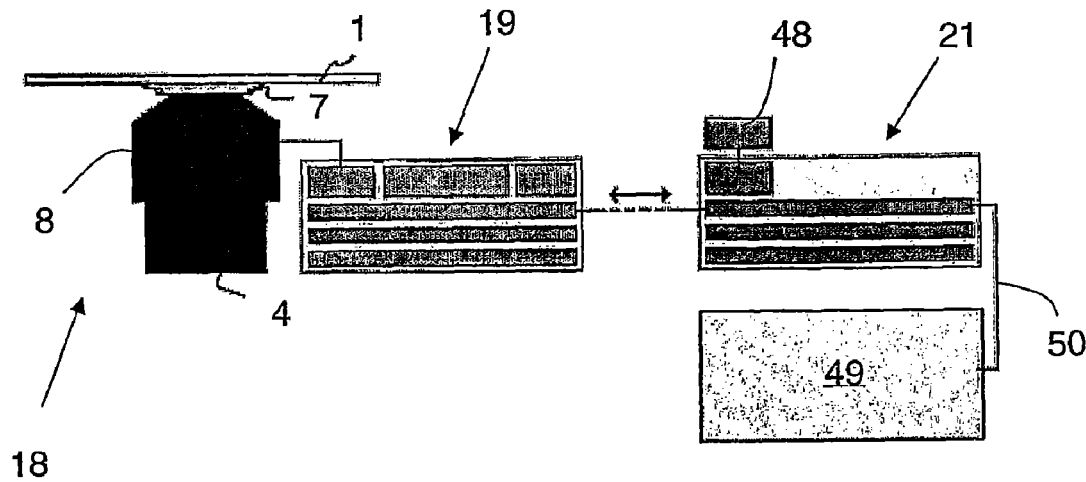
FIGS. 14a to 14c are schematic views of the execution of a method for reducing bubble formation and for simultaneously wetting the gap between the objective and the specimen with immersion liquid, in the context of immersion objectives according to the present invention.
Figure 14B:
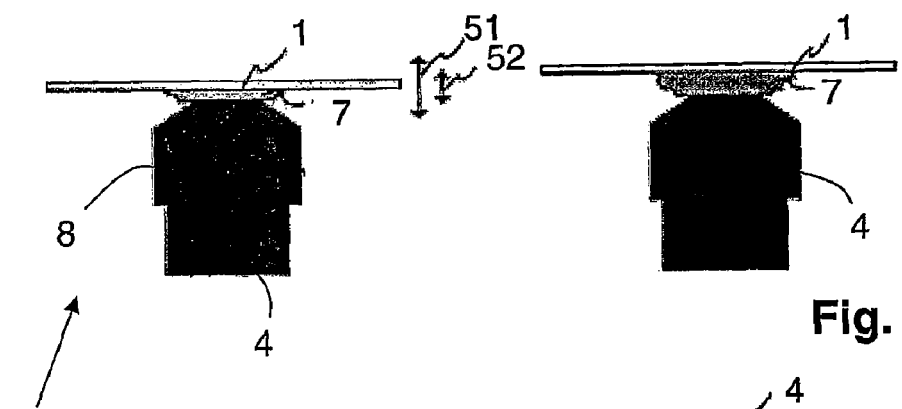
Figure 14C:
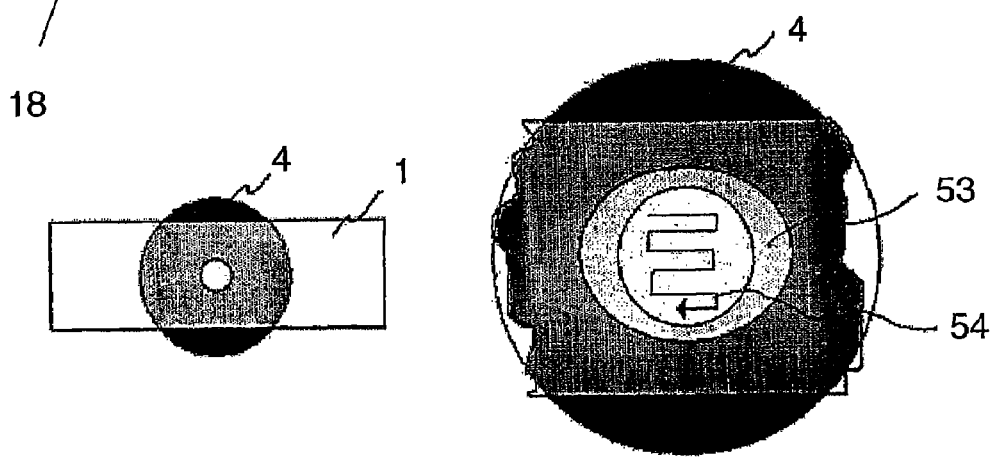

According to the depiction in FIG. 14a, immersion liquid is located between specimen slide 1 and objective body 4 or the outer lens. Because air bubbles readily form in immersion liquid 7 as it flows out, the objective or objective body 4 can be moved particularly advantageously in an X, Y, and Z direction, specifically in such a way that a pump-like movement is exerted on the immersion liquid. The purpose of this movement is to exert pressure on the air bubbles contained in the immersion liquid, so they can outgas. Objective body 4 is moved up and down in the Z direction for this purpose. This movement is evident from the motion sequence shown in FIG. 14b, and is indicated there by arrows 51, 52.

Because of adhesion forces, the immersion film does not detach as long as a relatively small Z movement is performed. The immersion film is instead extended and compressed, thus producing the pumping movement that moves the gas in the immersion liquid to the edge, so that outgassing can occur.

It is additionally possible to move objective body 4 in an X and Y direction, for example by means of a specimen slide stage. The immersion film is thereby correctly smeared out. The reference character 54 in FIG. 14c identifies a meander-shaped stage movement according to which the stage moves. The adhesion forces of the immersion liquid bring about a uniform distribution of the immersion medium in the region between the outer lens and the specimen slide.

Figure 15:
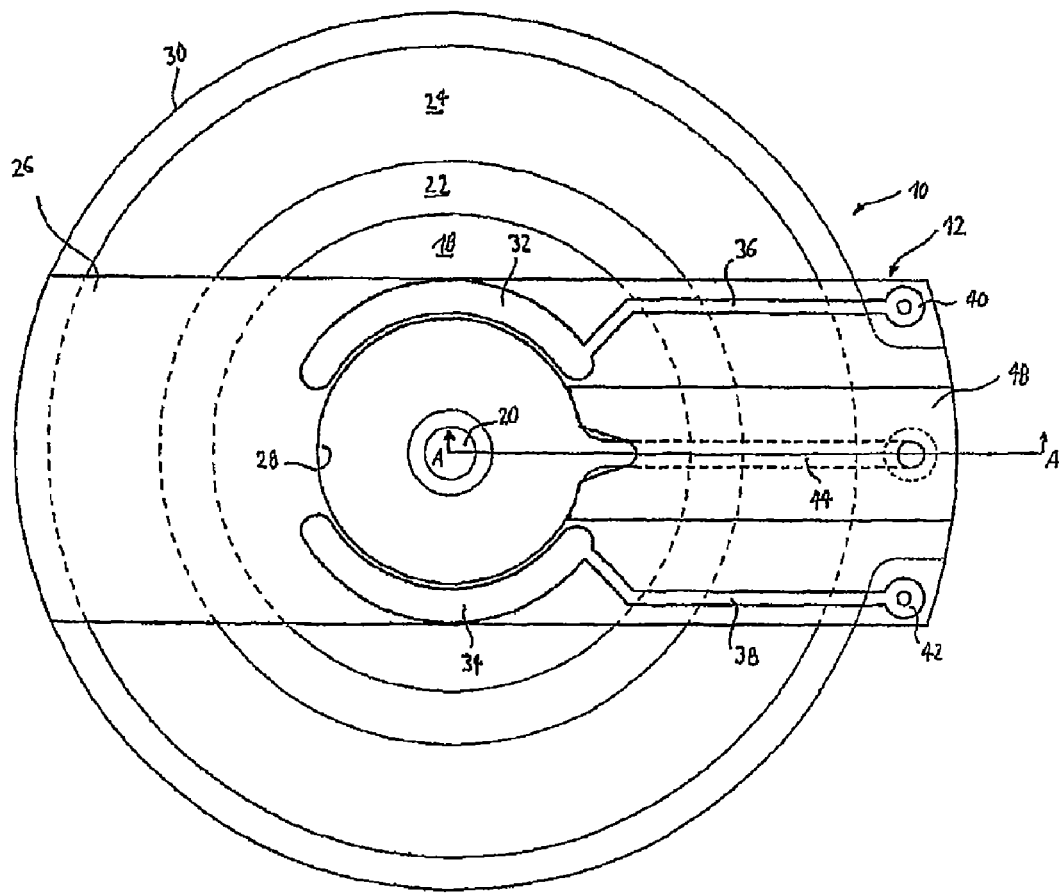
FIG. 15 is a plan view of a microscope objective on which is mounted an apparatus for constituting an immersion film, according to a refinement of the invention.
Figures 16, 17:
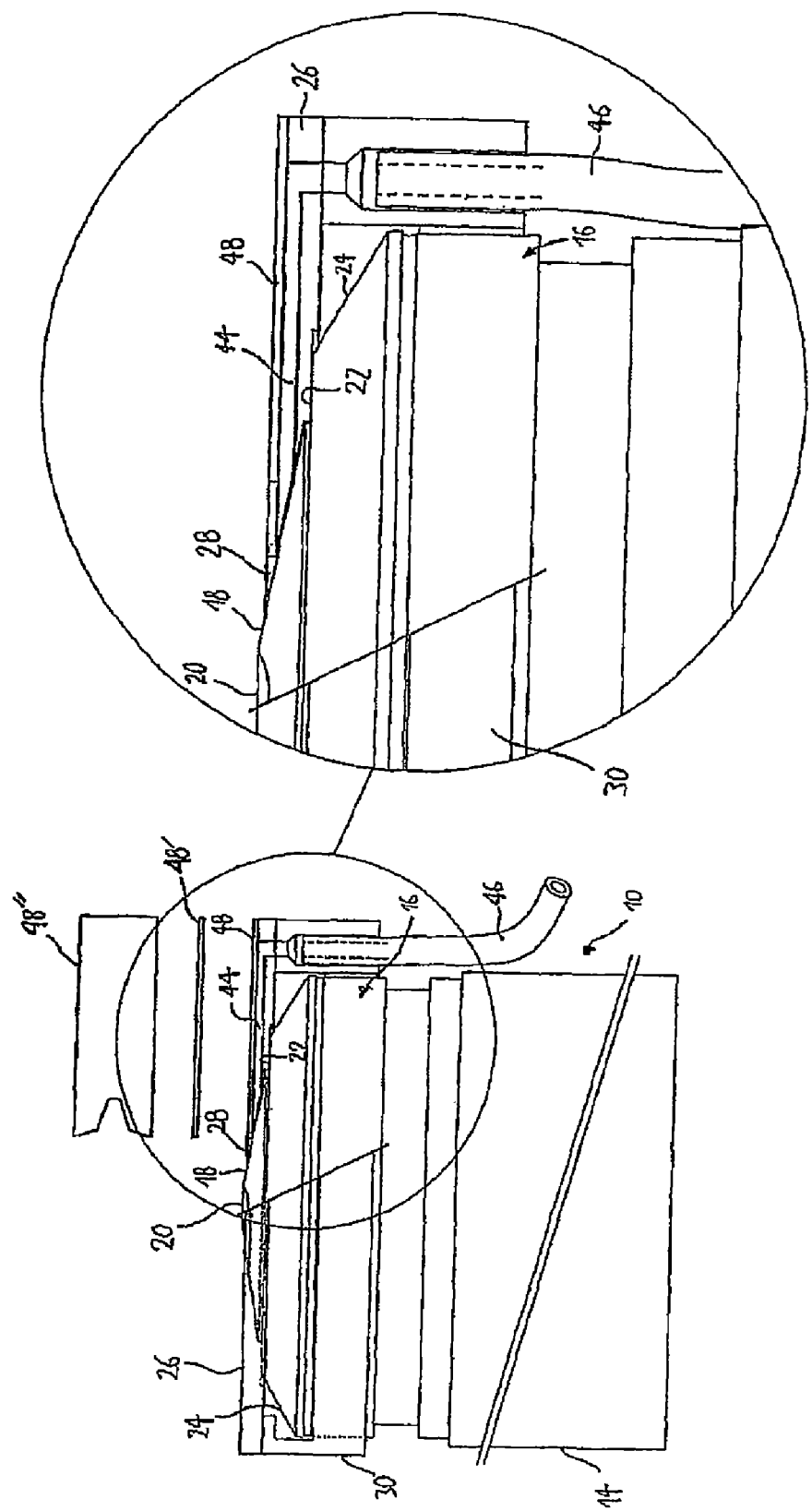
FIG. 16 is a partially sectioned side view of the microscope objective and apparatus according to FIG. 15.
FIG. 17 is an enlarged detail of the subject matter of FIG. 16.

FIG. 15 is a plan view of a microscope objective 10 on which is mounted an apparatus 12 for constituting an immersion film. FIG. 16 is a side view of objective 10 and of apparatus 12, in which view the right half (as depicted) of apparatus 12 is shown sectioned along line A-A of FIG. 15; and FIG. 17 is an enlarged depiction of the portion highlighted by the circle in FIG. 16.

As is most apparent from FIG. 16, objective 10 encompasses an objective body 14 and an objective head 16 on which apparatus 12 is mounted. Objective head 16 has an inner conical surface 18 at whose center is provided an objective lens 20 that can be an entrance or exit lens of objective 10. An annular horizontal surface 22 of objective head 16 is radially externally adjacent to inner conical surface 18. Horizontal surface 22 is surrounded by an outer conical surface 24.

Apparatus 12 encompasses a plate 26 in which a cutout 28 is embodied. When apparatus 12 is mounted onto objective 10 as shown in the Figures, inner conical surface 18 projects through cutout 28 in the plate. Cutout 28 of plate 26 forms an immersion film region that is described in more detail below.

Plate 26 is connected to a ring 30 that surrounds objective head 16 when apparatus 12 is mounted on objective 10.

In the exemplifying embodiment shown, plate 26 is made of a commercially usual circuit-board material that is made of glass-fiber fabric and epoxy resin and is also referred to as FR4 or FR5. Embodied on the surface of plate 26 are electrodes 32 and 34 that are arranged parallel to the edge of cutout 28. Electrodes 32 and 34 are connected via associated leads 36 and 38 to respective terminals 40 and 42.

Electrodes 32, 34 and leads 36, 38 are embodied, using usual etching techniques, on the circuit-board material from which plate 26 is formed, and can thus be manufactured extremely easily and economically. Electrodes 32, 34 and leads 36, 38 are preferably made up of a copper layer that is covered with a further layer of hard gold.

As is evident especially from FIG. 15 and FIG. 17, a channel 44 is embodied in plate 26, said channel communicating at one end with cutout 28 and at the other end with a hose 46. Channel 44 is formed by a groove that is milled into plate 26. The thickness of plate 26 is somewhat reduced on either side of the groove. Set into this reduced-thickness region is a further, thinner plate 48 that terminates flush with the surface of plate 26 and covers the groove in order to close off channel 44 at the top. Plate 48 is depicted once again in FIG. 16 for the sake of clarity, referenced as 48' in a side view and as 48" in a plan view.

In the embodiment shown, apparatus 12 is embodied as an adapter that can be placed onto a plurality of commercially usual objectives. In the embodiment shown, the underside of plate 26 is fixedly adhered onto the outer edge of ring 30 in order to mount the apparatus or adapter 12, by means of ring 30, on objective head 16 of objective 10.

The operation of apparatus 12 will be described below. An immersion liquid, for example deionized water, is delivered by a tubing pump, through hose 46 and channel 44 in plate 26, into cutout 28 in plate 26. Cutout 28 is thereby filled with the immersion liquid. During operation of the microscope, a sample slide, which contains samples to be investigated using the microscope, is arranged opposite lens 20, i.e. above objective head 16 as depicted in FIGS. 16 and 17. The focus of objective 10 is located approximately 0.2 mm above lens 20, and during operation the sample slide is also arranged at this very short distance. As a result of adhesion forces, the immersion liquid introduced into cutout 28 fills up the gap between lens 20 and the sample slide. In other words, an immersion film is constituted between lens 20 (and a portion of inner conical surface 18 surrounding it) and the sample slide The sample slide can be moved relative to objective 10 during operation, for example so that a plurality of samples can be scanned automatically. In that context, cutout 28 helps retain the immersion film in the region of lens 20 despite that relative movement. A portion of the immersion liquid is nevertheless lost, in the context of the relative movement, from the direct vicinity of lens 20. The immersion liquid can also dry out during long-term investigations, for example those performed on living cells.

To ensure that enough immersion liquid is always present, in the embodiment depicted an electrical voltage, in particular an alternating voltage, is applied between electrodes 32 and 34, and the conductivity of the immersion film between electrodes 32, 34, i.e. of the immersion film in cutout 28, is measured with the aid of an electronic system. Provision must be made that the immersion film is not confined to cutout 28, but can also be constituted beyond it as a result of capillary forces. In addition, the entire cutout 28 need not be completely filled with the immersion film at all times. Cutout 28 nevertheless forms an immersion film region in which the immersion film is intended to be constituted, and in which its condition is monitored by way of the conductivity measurement described above.

If the immersion film in cutout 28 becomes thin or begins to detach, this is detected by the fact that the resistance between electrodes 32, 34 rises, or the conductivity of the immersion film in the immersion film region decreases. As soon as the conductivity of the immersion film falls below a lower threshold value, a signal is sent to the tubing pump, whereupon the latter supplies further immersion liquid through hose 46 and channel 44 into cutout 28 in plate 26. This delivery of immersion liquid is terminated as soon as the conductivity of the immersion film between electrodes 32 and 34 exceeds an upper threshold value. Alternatively, the tubing pump can also be controlled so that after being switched on, and without monitoring an upper threshold value for the conductivity, it always delivers for a certain amount of time that is appropriate for furnishing a sufficient additional quantity of immersion liquid.

Electrodes 32, 34, leads 36, 38, and the electronic system for determining the conductivity of the immersion film form one embodiment of the sensor device recited above that is suitable for detecting the condition of the immersion film. If the immersion liquid is nonconductive, in an alternative embodiment an alternating field could be generated at electrodes 32 and 34 by applying an alternating electrical voltage. In this context, electrodes 32, 34 act as "plates" of a capacitor that could be coupled to an oscillator circuit. In the context of a dielectric immersion medium, the capacitance of this capacitor, and thus the resonant frequency of the oscillator circuit, would change as a function of the thickness of the immersion film. The condition of the immersion film could thus be detected on the basis of a capacitative effect thereof.

In an alternative embodiment, the presence of a sufficient immersion film can be checked using a calorimetric measurement method. This method utilizes the differing thermal conductivity of the medium surrounding the sensor. What is used for this purpose as a sensor is, for example, a temperature-dependent resistor, such as a PTC or NTC resistor, that is arranged in the immersion film region. A current is applied to the sensor so that it heats up. The sensor will heat up to a greater or lesser extent depending on whether or not the sensor is in the immersion film and is thus cooled by the immersion liquid, and the resistance value of the sensor will change correspondingly as a result. It is thus possible to detect, by sensing the resistance value of the sensor, whether a sufficient immersion film is present.

In an advantageous refinement, the pumping direction of the tubing pump can be reversed so that immersion liquid can be aspirated out of cutout 28 through channel 44 and hose 46. This is advantageous especially when objective 10 is moved away from the specimen slide, for example in order to change the objective or investigate a new sample, since the immersion liquid (which is then no longer needed) does not contaminate the microscope.

Although preferred exemplifying embodiments have been presented and described in detail in the drawings and in the description above, this should be regarded as merely exemplifying and not limiting the invention.

It is noted that only the preferred exemplifying embodiments are depicted and described, and that all changes and modifications that are within the scope of the claims at present and in the future are intended to be protected.

In order to avoid repetition, the reader is referred to the general portion of the description and to the appended Claims with regard to further advantageous embodiments of the apparatus according to the present invention.

The invention claimed is:

1. An immersion objective for microscopic investigation of a specimen, the objective comprising:
   an objective body;
   an outer lens disposed in the objective body;
   a delivery device including a cap disposed over the objective body so as to form an annular space delimited by an inner wall of the cap and an outer wall of the objective body and adapted to receive an immersion liquid, the cap being open in a region of the outer lens so as to form a gap with the outer lens, the cap including at least one connector configured to provide a continuous supply of the immersion liquid to the space so that the immersion liquid emerges through the gap to a region between the outer lens and at least one of the specimen and a specimen slide;
   a sensor device adapted to detect a condition of an immersion film of the immersion liquid in an immersion film region thereof, the sensor device being configured to detect the condition of the immersion film based on at least one of an electrical conductivity of the immersion film, an inductive effect of the immersion film in an alternating electromagnetic field and a capacitive effect of the immersion film in an alternating electromagnetic field; and a control device configured to control delivery of the immersion liquid based on the condition of the immersion film.

2. The objective according to claim 1, wherein the gap is rotationally symmetrical.

3. The objective according to claim 1, wherein the gap is an annular gap.

4. The objective according to claim 1, wherein at least one of the cap and the objective body includes recessed channels configured to convey the immersion liquid.

5. The objective according to claim 1, wherein the cap is provided with a sealed connection on a front region of the objective body having a wider cross section.

6. The objective according claim 1, wherein the cap includes a connecting region for mounting to the objective body.

7. The objective according to claim 6, wherein the cap is configured to be mounted to the objective body by a sliding of the connecting region onto the objective body.

8. The objective according to claim 6, wherein the cap is configured to be mounted to the objective body by an adhesive bonding of the connecting region to the objective body.

9. The objective according to claim 6, wherein the cap is configured to be thread-mounted to the objective body by a threadable securing of the connecting region to the objective body.

10. The objective according to claim 1, wherein the gap is adjustable in size by changing a position of the cap.

11. The objective according to claim 10, wherein the gap is adjustable to adapt to a viscosity and surface tension of the immersion liquid.

12. The objective according to claim 10, wherein the gap is adjustable so as to prevent the immersion liquid from emerging from the gap without the application of pressure.

13. The objective according to claim 6, wherein the connecting region includes a solid ring.

14. The objective according to claim 6, wherein the connecting region includes an annular channel having an inner wall contacting the objective body.

15. The objective according to claim 1, wherein the cap is adapted to substantially correspond to at least one of a contour of objective body and another contour of the objective.

16. The objective according to claim 1, wherein the at least one connector includes first and second connectors, each connector adapted to perform at least one of introducing and discharging the immersion liquid into and from the space in the cap, respectively, and wherein the immersion liquid provided through each connector is at least one of the same and different.

17. The objective according to claim 1, wherein the at least one connector is connected via at least one line to at least one reservoir.

18. The objective according to claim 17, wherein the at least one reservoir includes at least one of the immersion liquid and a cleaning liquid.

19. The objective according to claim 18, wherein the at least one reservoir is at least one of refillable and exchangeable.

20. The objective according to claim 18, further comprising at least one metering pump conveying the at least one of the immersion liquid and a cleaning liquid.

21. The objective according to claim 18, further comprising a heating device so as to heat the at least one of the immersion liquid and a cleaning liquid.

22. The objective according to claim 1, wherein the at least one connector is connected via at least one line to at least one collection container receiving at least one of the immersion liquid and a cleaning liquid.

23. An objective turret for microscopic investigation of a specimen comprising:
a plurality of immersion objectives disposed in the objective turret in a rotationally symmetric arrangement, each of the objectives including:
an objective body;
an outer lens disposed in the objective body; and
a delivery device including a cap disposed over the objective body so as to form an annular space delimited by an inner wall of the cap and an outer wall of the objective body and adapted to receive an immersion liquid, the cap being open in a region of the outer lens so as to form a gap with the outer lens, the cap including at least one connector configured to provide a continuous supply of the immersion liquid to the space so that the immersion liquid emerges through the gap to a region between the outer lens and at least one of the specimen and a specimen slide, and
at least one of a reservoir and a collection chamber the reservoir being adapted to provide at least one of the immersion liquid and a cleaning liquid to at least one of the caps and the collection container being adapted to receive at least one of the immersion liquid and a cleaning liquid.

24. The objective turret according to claim 23, wherein the objectives are threaded into the objective turret such that the connectors are directed inward.

25. The objective turret according to claim 23, wherein each of the objectives has at least one respective reservoir associated with it.

26. The objective turret according to claim 23, wherein the objective turret includes at least one pump configured to convey the at least one of the immersion liquid and a cleaning liquid.

27. The objective turret according to claim 26, wherein the objective turret includes a control system configured to meter the at least one of the immersion liquid and a cleaning liquid.

28. The objective turret according to claim 27, wherein the control system includes a microcontroller.

29. The objective turret according to claim 27, wherein the objectives include sensors attached to the objectives, and wherein the control system includes an electronic system adapted to transmit control signals, interrogate the sensors and control the at least one pump.

30. The objective turret according to claim 29, wherein the sensors are configured to detect a fill level in the reservoir.

31. The objective turret according to claim 29, wherein the sensors are configured to detect a current quantity of the immersion liquid at each objective.

32. The objective turret according to claim 23, wherein each objective includes a valve connected to at least one reservoir.

33. The objective turret according to claim 23, further comprising an energy supply system.

34. The objective turret according to claim 23, further comprising modules combined into a functional group in a housing.

35. The objective turret according to claim 23, wherein at least two of the objectives can be simultaneously selected for operation and supplied with the immersion liquid.

36. The objective turret according to claim 31, wherein the objective is movable at an adjustable speed with respect to the at least one of the specimen and a specimen slide depending on delivery and presence of the immersion liquid.

37. The objective according to claim 1, wherein the immersion liquid is configured to be acted upon by acoustic waves.

38. The objective according to claim 1, wherein the control device is configured to authorize delivery of the immersion liquid when an electrical conductivity of the immersion film in a direction perpendicular to a thickness direction of the immersion film falls below a lower threshold, and terminate delivery of the immersion liquid when the electrical conductivity exceeds an upper threshold.

39. An immersion objective for microscopic investigation of a specimen, the objective comprising:
an objective body;
an outer lens disposed in the objective body;
a delivery device including a cap disposed over the objective body so as to form an annular space delimited by an inner wall of the cap and an outer wall of the objective body and adapted to receive an immersion liquid, the cap being open in a region of the outer lens so as to form a gap with the outer lens the cap including at least one connector configured to provide a continuous supply of the immersion liquid to the space so that the immersion liquid emerges through the gap to a region between the outer lens and at least one of the specimen and a specimen slide;
a sensor device adapted to detect a condition of an immersion film of the immersion liquid in an immersion film region thereof, the sensor device including an apparatus configured to measure the temperature of the immersion liquid; and
a control device configured to control delivery of the immersion liquid based on the condition of the immersion film.

40. An immersion objective for microscopic investigation of a specimen, the objective comprising:
an objective body;
an outer lens disposed in the objective body;
a delivery device including a cap disposed over the objective body so as to form a space adapted to receive an immersion liquid, the cap being open in a region of the outer lens so as to form a gap with the outer lens, the cap including at least one connector configured to provide a continuous supply of the immersion liquid to the space so that the immersion liquid emerges through the gap to a region between the outer lens and at least one of the specimen and a specimen slide,
a sensor device adapted to detect a condition of an immersion film of the immersion liquid in an immersion film region thereof; and
a control device configured to control delivery of the immersion liquid based on the condition of the immersion film
wherein the cap includes a plate having a cutout configured to form the immersion film region.

41. The objective according to claim 40, wherein the plate includes at least one of an electrically nonconductive material and a circuit-board material.

42. The objective according to claim 41, wherein the electrically nonconductive material includes at least one of plastic, ceramic and polytetrafluorethylene, and wherein the circuit-board material includes at least one of a glass-fiber fabric and an epoxy resin.

43. The objective according to claim 40, wherein the sensor device includes at least one of electrodes and electrical leads in layers on the plate.

44. The objective according to claim 43, wherein the layers include a copper layer covered with a hard gold layer.

45. A method for producing an immersion film of an immersion liquid between a lens of a microscope objective and at least one of a specimen and a specimen slide, the method comprising:
- delivering the immersion liquid into an immersion film region formed by an objective-mounted element including a cap disposed over the objective body so as to form an annular space delimited by an inner wall of the cap and an outer wall of the objective for receiving the immersion liquid, the cap being open in a region of the lens of the objective so as to form a gap with the lens, the cap including at least one connector configured to provide a continuous supply of the immersion liquid to the space so that the immersion liquid emerges through the gap to the immersion film region;
- detecting a condition of the immersion film in the immersion film region based on at least one of an electrical conductivity of the immersion film, an inductive effect of the immersion film in an alternating electromagnetic field, and a capacitive effect of the immersion film in an alternating electromagnetic field using a sensor device; and
- adjusting the delivery of additional immersion liquid through the use of a control device based on the detected condition of the immersion film.

46. An objective turret for microscopic investigation of a specimen comprising:
- a plurality of immersion objectives each including:
  - an objective body;
  - an outer lens disposed in the objective body; and
  - a delivery device including a cap disposed over the objective body so as to form an annular space delimited by an inner wall of the cap and an outer wall of the objective body and adapted to receive an immersion liquid, the cap being open in a region of the outer lens so as to form a gap with the outer lens, the cap including at least one connector configured to provide a continuous supply of the immersion liquid to the space so that the immersion liquid emerges through the gap to a region between the outer lens and at least one of the specimen and a specimen slide wherein the objectives are disposed in the objective turret in a rotationally symmetrical arrangement; and
- an energy supply system.

* * * * *